(12) United States Patent
Ciesla et al.

(10) Patent No.: US 9,075,525 B2
(45) Date of Patent: *Jul. 7, 2015

(54) USER INTERFACE SYSTEM

(75) Inventors: Craig Michael Ciesla, Mountain View, CA (US); Micah B. Yairi, Daly City, CA (US)

(73) Assignee: Tactus Technology, Inc., Fremont, CA (US)

(*) Notice: Subject to any disclaimer, the term of this patent is extended or adjusted under 35 U.S.C. 154(b) by 409 days.

This patent is subject to a terminal disclaimer.

(21) Appl. No.: 13/456,031

(22) Filed: Apr. 25, 2012

(65) Prior Publication Data

US 2012/0206364 A1 Aug. 16, 2012

Related U.S. Application Data

(63) Continuation of application No. 12/652,704, filed on Jan. 5, 2010, now Pat. No. 8,179,377, which is a continuation-in-part of application No. 12/319,334, filed on Jan. 5, 2009, now Pat. No. 8,154,527, which is (Continued)

(51) Int. Cl.
*G06F 3/041* (2006.01)
*G06F 3/0488* (2013.01)
(Continued)

(52) U.S. Cl.
CPC .......... *G06F 3/04886* (2013.01); *G06F 3/0488* (2013.01); *G06F 3/016* (2013.01); *G06F 3/044* (2013.01)

(58) Field of Classification Search
CPC ..... G06F 3/04886; G06F 3/044; G06F 3/016; G06F 3/0488

USPC ............ 345/173, 156; 178/18.01, 18.03
See application file for complete search history.

(56) References Cited

U.S. PATENT DOCUMENTS

| 3,034,628 A | 5/1962 | Wadey |
| 3,659,354 A | 5/1972 | Sutherland |
| 3,759,108 A | 9/1973 | Borom et al. |

(Continued)

FOREIGN PATENT DOCUMENTS

| CN | 1260525 A | 7/2000 |
| CN | 1530818 A | 9/2004 |

(Continued)

OTHER PUBLICATIONS

Preumont, A. Vibration Control of Active Structures: An Introduction, Jul. 2011.

(Continued)

*Primary Examiner* — Priyank Shah
(74) *Attorney, Agent, or Firm* — Jeffrey Schox

(57) ABSTRACT

The user interface system of one embodiment of the invention includes a sheet that defines a surface on one side and at least partially defines a first cavity and a second cavity on an opposite side; a fluid network coupled to the first and second cavities; a displacement device coupled to the fluid network that displaces fluid within the fluid network and expands both the first and second cavities concurrently, thereby deforming a first and a second particular region of the surface; and a touch sensor coupled to the sheet and adapted to sense a user touch proximate the first and second particular regions of the surface. The user interface system of another embodiment of the invention includes a displacement device coupled to the fluid network that displaces fluid within the fluid network and selectively expands one of the first and second cavities.

25 Claims, 13 Drawing Sheets

Related U.S. Application Data a continuation-in-part of application No. 11/969,848, filed on Jan. 4, 2008, now Pat. No. 8,547,339, application No. 13/456,031, which is a continuation-in-part of application No. 13/414,589, filed on Mar. 7, 2012, which is a continuation-in-part of application No. 11/969,848, and a continuation of application No. 12/319,334, application No. 13/456,031, which is a continuation-in-part of application No. 11/969,848.

(51) Int. Cl.
*G06F 3/01* (2006.01)
*G06F 3/044* (2006.01)

(56) References Cited

U.S. PATENT DOCUMENTS

| | | |
|---|---|---|
| 3,780,236 A | 12/1973 | Gross |
| 3,818,487 A | 6/1974 | Brody et al. |
| 4,109,118 A | 8/1978 | Kley |
| 4,209,819 A | 6/1980 | Seignemartin |
| 4,290,343 A | 9/1981 | Gram |
| 4,307,268 A | 12/1981 | Harper |
| 4,467,321 A | 8/1984 | Volnak |
| 4,477,700 A | 10/1984 | Balash et al. |
| 4,517,421 A | 5/1985 | Margolin |
| 4,543,000 A | 9/1985 | Hasenbalg |
| 4,584,625 A | 4/1986 | Kellogg |
| 4,700,025 A | 10/1987 | Hatayama et al. |
| 4,772,205 A | 9/1988 | Chlumsky et al. |
| 4,920,343 A | 4/1990 | Schwartz |
| 4,940,734 A | 7/1990 | Ley et al. |
| 5,194,852 A | 3/1993 | More et al. |
| 5,195,659 A | 3/1993 | Eiskant |
| 5,212,473 A | 5/1993 | Louis |
| 5,222,895 A | 6/1993 | Fricke |
| 5,286,199 A | 2/1994 | Kipke |
| 5,369,228 A | 11/1994 | Faust |
| 5,412,189 A | 5/1995 | Cragun |
| 5,459,461 A | 10/1995 | Crowley et al. |
| 5,488,204 A | 1/1996 | Mead et al. |
| 5,496,174 A | 3/1996 | Garner |
| 5,666,112 A | 9/1997 | Crowley et al. |
| 5,717,423 A | 2/1998 | Parker |
| 5,729,222 A | 3/1998 | Iggulden et al. |
| 5,742,241 A | 4/1998 | Crowley et al. |
| 5,754,023 A | 5/1998 | Roston et al. |
| 5,766,013 A | 6/1998 | Vuyk |
| 5,767,839 A | 6/1998 | Rosenberg |
| 5,835,080 A | 11/1998 | Beeteson et al. |
| 5,880,411 A | 3/1999 | Gillespie et al. |
| 5,889,236 A | 3/1999 | Gillespie et al. |
| 5,917,906 A | 6/1999 | Thornton |
| 5,943,043 A | 8/1999 | Furuhata et al. |
| 5,977,867 A | 11/1999 | Blouin |
| 5,982,304 A | 11/1999 | Selker et al. |
| 6,067,116 A | 5/2000 | Yamano et al. |
| 6,154,198 A | 11/2000 | Rosenberg |
| 6,154,201 A | 11/2000 | Levin et al. |
| 6,160,540 A | 12/2000 | Fishkin et al. |
| 6,169,540 B1 | 1/2001 | Rosenberg et al. |
| 6,188,391 B1 | 2/2001 | Seely et al. |
| 6,218,966 B1 | 4/2001 | Goodwin et al. |
| 6,243,074 B1 | 6/2001 | Fishkin et al. |
| 6,243,078 B1 | 6/2001 | Rosenberg |
| 6,268,857 B1 | 7/2001 | Fishkin et al. |
| 6,271,828 B1 | 8/2001 | Rosenberg et al. |
| 6,278,441 B1 | 8/2001 | Gouzman et al. |
| 6,300,937 B1 | 10/2001 | Rosenberg |
| 6,310,614 B1 | 10/2001 | Maeda et al. |
| 6,323,846 B1 | 11/2001 | Westerman et al. |
| 6,337,678 B1 | 1/2002 | Fish |
| 6,354,839 B1 * | 3/2002 | Schmidt et al. ............... 434/113 |
| 6,356,259 B1 | 3/2002 | Maeda et al. |
| 6,359,572 B1 | 3/2002 | Vale |
| 6,366,272 B1 | 4/2002 | Rosenberg et al. |
| 6,369,803 B2 | 4/2002 | Brisebois et al. |
| 6,384,743 B1 | 5/2002 | Vanderheiden |
| 6,414,671 B1 | 7/2002 | Gillespie et al. |
| 6,429,846 B2 | 8/2002 | Rosenberg et al. |
| 6,437,771 B1 | 8/2002 | Rosenberg et al. |
| 6,462,294 B2 | 10/2002 | Davidson et al. |
| 6,469,692 B2 | 10/2002 | Rosenberg |
| 6,486,872 B2 | 11/2002 | Rosenberg et al. |
| 6,498,353 B2 | 12/2002 | Nagle et al. |
| 6,501,462 B1 | 12/2002 | Garner |
| 6,509,892 B1 | 1/2003 | Cooper et al. |
| 6,529,183 B1 | 3/2003 | MacLean et al. |
| 6,573,844 B1 | 6/2003 | Venolia et al. |
| 6,636,202 B2 | 10/2003 | Ishmael, Jr. et al. |
| 6,639,581 B1 | 10/2003 | Moore et al. |
| 6,655,788 B1 | 12/2003 | Freeman |
| 6,657,614 B1 | 12/2003 | Ito et al. |
| 6,667,738 B2 | 12/2003 | Murphy |
| 6,681,031 B2 | 1/2004 | Cohen et al. |
| 6,683,627 B1 | 1/2004 | Ullmann et al. |
| 6,686,911 B1 | 2/2004 | Levin et al. |
| 6,697,086 B2 | 2/2004 | Rosenberg et al. |
| 6,700,556 B2 | 3/2004 | Richley et al. |
| 6,703,924 B2 | 3/2004 | Tecu et al. |
| 6,743,021 B2 | 6/2004 | Prince et al. |
| 6,788,295 B1 | 9/2004 | Inkster |
| 6,819,316 B2 | 11/2004 | Schulz et al. |
| 6,850,222 B1 | 2/2005 | Rosenberg |
| 6,861,961 B2 | 3/2005 | Sandbach et al. |
| 6,877,986 B2 | 4/2005 | Fournier et al. |
| 6,881,063 B2 | 4/2005 | Yang |
| 6,930,234 B2 | 8/2005 | Davis |
| 6,937,225 B1 | 8/2005 | Kehlstadt et al. |
| 6,975,305 B2 | 12/2005 | Yamashita |
| 6,979,164 B2 | 12/2005 | Kramer |
| 6,982,696 B1 | 1/2006 | Shahoian |
| 6,995,745 B2 | 2/2006 | Boon et al. |
| 7,027,032 B2 | 4/2006 | Rosenberg et al. |
| 7,056,051 B2 | 6/2006 | Fiffie |
| 7,061,467 B2 | 6/2006 | Rosenberg |
| 7,064,655 B2 | 6/2006 | Murray et al. |
| 7,079,111 B2 | 7/2006 | Ho |
| 7,081,888 B2 | 7/2006 | Cok et al. |
| 7,096,852 B2 | 8/2006 | Gregorio |
| 7,102,541 B2 | 9/2006 | Rosenberg |
| 7,104,152 B2 | 9/2006 | Levin et al. |
| 7,106,305 B2 | 9/2006 | Rosenberg |
| 7,106,313 B2 | 9/2006 | Schena et al. |
| 7,109,967 B2 | 9/2006 | Hioki et al. |
| 7,112,737 B2 | 9/2006 | Ramstein |
| 7,113,166 B1 | 9/2006 | Rosenberg et al. |
| 7,116,317 B2 | 10/2006 | Gregorio et al. |
| 7,124,425 B1 | 10/2006 | Anderson, Jr. et al. |
| 7,129,854 B2 | 10/2006 | Arneson et al. |
| 7,131,073 B2 | 10/2006 | Rosenberg et al. |
| 7,136,045 B2 | 11/2006 | Rosenberg et al. |
| 7,138,977 B2 | 11/2006 | Kinerk et al. |
| 7,138,985 B2 | 11/2006 | Nakajima |
| 7,143,785 B2 | 12/2006 | Maerkl et al. |
| 7,144,616 B1 | 12/2006 | Unger et al. |
| 7,148,875 B2 | 12/2006 | Rosenberg et al. |
| 7,151,432 B2 | 12/2006 | Tierling |
| 7,151,527 B2 | 12/2006 | Culver |
| 7,151,528 B2 | 12/2006 | Taylor et al. |
| 7,154,470 B2 | 12/2006 | Tierling |
| 7,158,112 B2 | 1/2007 | Rosenberg et al. |
| 7,159,008 B1 | 1/2007 | Wies et al. |
| 7,161,276 B2 | 1/2007 | Face |
| 7,161,580 B2 | 1/2007 | Bailey et al. |
| 7,168,042 B2 | 1/2007 | Braun et al. |
| 7,176,903 B2 | 2/2007 | Katsuki et al. |
| 7,182,691 B1 | 2/2007 | Schena |
| 7,191,191 B2 | 3/2007 | Peurach et al. |
| 7,193,607 B2 | 3/2007 | Moore et al. |
| 7,195,170 B2 | 3/2007 | Matsumoto et al. |
| 7,196,688 B2 | 3/2007 | Schena |
| 7,198,137 B2 | 4/2007 | Olien |
| 7,199,790 B2 | 4/2007 | Rosenberg et al. |

(56) References Cited

U.S. PATENT DOCUMENTS

| | | | |
|---|---|---|---|
| 7,202,851 | B2 | 4/2007 | Cunningham et al. |
| 7,205,981 | B2 | 4/2007 | Cunningham |
| 7,208,671 | B2 | 4/2007 | Chu |
| 7,209,028 | B2 | 4/2007 | Boronkay et al. |
| 7,209,117 | B2 | 4/2007 | Rosenberg et al. |
| 7,209,118 | B2 | 4/2007 | Shahoian et al. |
| 7,210,160 | B2 | 4/2007 | Anderson, Jr. et al. |
| 7,215,326 | B2 | 5/2007 | Rosenberg |
| 7,216,671 | B2 | 5/2007 | Unger et al. |
| 7,218,310 | B2 | 5/2007 | Tierling et al. |
| 7,218,313 | B2 | 5/2007 | Marcus et al. |
| 7,233,313 | B2 | 6/2007 | Levin et al. |
| 7,233,315 | B2 | 6/2007 | Gregorio et al. |
| 7,233,476 | B2 | 6/2007 | Goldenberg et al. |
| 7,236,157 | B2 | 6/2007 | Schena et al. |
| 7,245,202 | B2 | 7/2007 | Levin |
| 7,245,292 | B1 | 7/2007 | Custy |
| 7,249,951 | B2 | 7/2007 | Bevirt et al. |
| 7,250,128 | B2 | 7/2007 | Unger et al. |
| 7,253,803 | B2 | 8/2007 | Schena et al. |
| 7,253,807 | B2 | 8/2007 | Nakajima |
| 7,265,750 | B2 | 9/2007 | Rosenberg |
| 7,280,095 | B2 | 10/2007 | Grant |
| 7,283,120 | B2 | 10/2007 | Grant |
| 7,283,123 | B2 | 10/2007 | Braun et al. |
| 7,283,696 | B2 | 10/2007 | Ticknor et al. |
| 7,289,106 | B2 | 10/2007 | Bailey et al. |
| 7,289,111 | B2 | 10/2007 | Asbill |
| 7,307,619 | B2 | 12/2007 | Cunningham et al. |
| 7,308,831 | B2 | 12/2007 | Cunningham et al. |
| 7,319,374 | B2 | 1/2008 | Shahoian |
| 7,336,260 | B2 | 2/2008 | Martin et al. |
| 7,336,266 | B2 | 2/2008 | Hayward et al. |
| 7,339,572 | B2 | 3/2008 | Schena |
| 7,339,580 | B2 | 3/2008 | Westerman et al. |
| 7,342,573 | B2 | 3/2008 | Ryynaenen |
| 7,355,595 | B2 | 4/2008 | Bathiche et al. |
| 7,369,115 | B2 | 5/2008 | Cruz-Hernandez et al. |
| 7,382,357 | B2 | 6/2008 | Panotopoulos et al. |
| 7,390,157 | B2 | 6/2008 | Kramer |
| 7,391,861 | B2 | 6/2008 | Levy |
| 7,397,466 | B2 | 7/2008 | Bourdelais et al. |
| 7,403,191 | B2 | 7/2008 | Sinclair |
| 7,432,910 | B2 | 10/2008 | Shahoian |
| 7,432,911 | B2 | 10/2008 | Skarine |
| 7,432,912 | B2 | 10/2008 | Cote et al. |
| 7,433,719 | B2 | 10/2008 | Dabov |
| 7,471,280 | B2 | 12/2008 | Prins |
| 7,489,309 | B2 | 2/2009 | Levin et al. |
| 7,511,702 | B2 | 3/2009 | Hotelling |
| 7,522,152 | B2 | 4/2009 | Olien et al. |
| 7,545,289 | B2 | 6/2009 | Mackey et al. |
| 7,548,232 | B2 | 6/2009 | Shahoian et al. |
| 7,551,161 | B2 | 6/2009 | Mann |
| 7,561,142 | B2 | 7/2009 | Shahoian et al. |
| 7,567,232 | B2 | 7/2009 | Rosenberg |
| 7,567,243 | B2 * | 7/2009 | Hayward ...................... 345/184 |
| 7,589,714 | B2 | 9/2009 | Funaki |
| 7,592,999 | B2 | 9/2009 | Rosenberg et al. |
| 7,605,800 | B2 | 10/2009 | Rosenberg |
| 7,609,178 | B2 | 10/2009 | Son et al. |
| 7,656,393 | B2 | 2/2010 | King et al. |
| 7,659,885 | B2 | 2/2010 | Kraus et al. |
| 7,671,837 | B2 | 3/2010 | Forsblad et al. |
| 7,679,611 | B2 | 3/2010 | Schena |
| 7,679,839 | B2 | 3/2010 | Polyakov et al. |
| 7,688,310 | B2 | 3/2010 | Rosenberg |
| 7,701,438 | B2 | 4/2010 | Chang et al. |
| 7,728,820 | B2 | 6/2010 | Rosenberg et al. |
| 7,733,575 | B2 | 6/2010 | Heim et al. |
| 7,743,348 | B2 | 6/2010 | Robbins et al. |
| 7,755,602 | B2 | 7/2010 | Tremblay et al. |
| 7,808,488 | B2 | 10/2010 | Martin et al. |
| 7,834,853 | B2 | 11/2010 | Finney et al. |
| 7,843,424 | B2 | 11/2010 | Rosenberg et al. |
| 7,864,164 | B2 | 1/2011 | Cunningham et al. |
| 7,869,589 | B2 | 1/2011 | Tuovinen |
| 7,890,257 | B2 | 2/2011 | Fyke et al. |
| 7,890,863 | B2 | 2/2011 | Grant et al. |
| 7,920,131 | B2 | 4/2011 | Westerman |
| 7,924,145 | B2 | 4/2011 | Yuk et al. |
| 7,944,435 | B2 | 5/2011 | Rosenberg et al. |
| 7,952,498 | B2 | 5/2011 | Higa |
| 7,956,770 | B2 | 6/2011 | Klinghult et al. |
| 7,973,773 | B2 | 7/2011 | Pryor |
| 7,978,181 | B2 | 7/2011 | Westerman |
| 7,978,183 | B2 | 7/2011 | Rosenberg et al. |
| 7,978,186 | B2 | 7/2011 | Vassallo et al. |
| 7,979,797 | B2 | 7/2011 | Schena |
| 7,982,720 | B2 | 7/2011 | Rosenberg et al. |
| 7,986,303 | B2 | 7/2011 | Braun et al. |
| 7,986,306 | B2 | 7/2011 | Eich et al. |
| 7,989,181 | B2 | 8/2011 | Blattner et al. |
| 7,999,660 | B2 | 8/2011 | Cybart et al. |
| 8,002,089 | B2 | 8/2011 | Jasso et al. |
| 8,004,492 | B2 | 8/2011 | Kramer et al. |
| 8,013,843 | B2 | 9/2011 | Pryor |
| 8,020,095 | B2 | 9/2011 | Braun et al. |
| 8,022,933 | B2 | 9/2011 | Hardacker et al. |
| 8,031,181 | B2 | 10/2011 | Rosenberg et al. |
| 8,044,826 | B2 | 10/2011 | Yoo |
| 8,047,849 | B2 | 11/2011 | Ahn et al. |
| 8,049,734 | B2 | 11/2011 | Rosenberg et al. |
| 8,059,104 | B2 | 11/2011 | Shahoian et al. |
| 8,059,105 | B2 | 11/2011 | Rosenberg et al. |
| 8,063,892 | B2 | 11/2011 | Shahoian et al. |
| 8,063,893 | B2 | 11/2011 | Rosenberg et al. |
| 8,068,605 | B2 | 11/2011 | Holmberg |
| 8,077,154 | B2 | 12/2011 | Emig et al. |
| 8,077,440 | B2 | 12/2011 | Krabbenborg et al. |
| 8,077,941 | B2 | 12/2011 | Assmann |
| 8,094,121 | B2 | 1/2012 | Obermeyer et al. |
| 8,094,806 | B2 | 1/2012 | Levy |
| 8,103,472 | B2 | 1/2012 | Braun et al. |
| 8,106,787 | B2 | 1/2012 | Nurmi |
| 8,115,745 | B2 | 2/2012 | Gray |
| 8,123,660 | B2 | 2/2012 | Kruse et al. |
| 8,125,347 | B2 | 2/2012 | Fahn |
| 8,125,461 | B2 | 2/2012 | Weber et al. |
| 8,130,202 | B2 | 3/2012 | Levine et al. |
| 8,144,129 | B2 | 3/2012 | Hotelling et al. |
| 8,144,271 | B2 | 3/2012 | Han |
| 8,154,512 | B2 | 4/2012 | Olien et al. |
| 8,154,527 | B2 | 4/2012 | Ciesla et al. |
| 8,159,461 | B2 | 4/2012 | Martin et al. |
| 8,162,009 | B2 | 4/2012 | Chaffee |
| 8,164,573 | B2 | 4/2012 | Dacosta et al. |
| 8,166,649 | B2 | 5/2012 | Moore |
| 8,169,306 | B2 | 5/2012 | Schmidt et al. |
| 8,169,402 | B2 | 5/2012 | Shahoian et al. |
| 8,174,372 | B2 | 5/2012 | Da Costa |
| 8,174,495 | B2 | 5/2012 | Takashima et al. |
| 8,174,508 | B2 | 5/2012 | Sinclair et al. |
| 8,174,511 | B2 | 5/2012 | Takenaka et al. |
| 8,178,808 | B2 | 5/2012 | Strittmatter |
| 8,179,375 | B2 | 5/2012 | Ciesla et al. |
| 8,179,377 | B2 | 5/2012 | Ciesla et al. |
| 8,188,989 | B2 | 5/2012 | Levin et al. |
| 8,195,243 | B2 | 6/2012 | Kim et al. |
| 8,199,107 | B2 | 6/2012 | Xu et al. |
| 8,199,124 | B2 | 6/2012 | Ciesla et al. |
| 8,203,094 | B2 | 6/2012 | Mittleman et al. |
| 8,203,537 | B2 | 6/2012 | Tanabe et al. |
| 8,207,950 | B2 | 6/2012 | Ciesla et al. |
| 8,212,772 | B2 | 7/2012 | Shahoian |
| 8,217,903 | B2 | 7/2012 | Ma et al. |
| 8,217,904 | B2 | 7/2012 | Kim |
| 8,223,278 | B2 | 7/2012 | Kim et al. |
| 8,224,392 | B2 | 7/2012 | Kim et al. |
| 8,228,305 | B2 | 7/2012 | Pryor |
| 8,232,976 | B2 | 7/2012 | Yun et al. |
| 8,243,038 | B2 | 8/2012 | Ciesla et al. |
| 8,253,052 | B2 | 8/2012 | Chen |
| 8,253,703 | B2 | 8/2012 | Eldering |

(56) References Cited

U.S. PATENT DOCUMENTS

| | | |
|---|---|---|
| 8,279,172 B2 | 10/2012 | Braun et al. |
| 8,279,193 B1 | 10/2012 | Birnbaum et al. |
| 8,310,458 B2 | 11/2012 | Faubert et al. |
| 8,345,013 B2 | 1/2013 | Heubel et al. |
| 8,350,820 B2 | 1/2013 | Deslippe et al. |
| 8,362,882 B2 | 1/2013 | Heubel et al. |
| 8,363,008 B2 | 1/2013 | Ryu et al. |
| 8,367,957 B2 | 2/2013 | Strittmatter |
| 8,368,641 B2 | 2/2013 | Tremblay et al. |
| 8,378,797 B2 | 2/2013 | Pance et al. |
| 8,384,680 B2 | 2/2013 | Paleczny et al. |
| 8,390,594 B2 | 3/2013 | Modarres et al. |
| 8,395,587 B2 | 3/2013 | Cauwels et al. |
| 8,395,591 B2 | 3/2013 | Kruglick |
| 8,400,402 B2 | 3/2013 | Son |
| 8,400,410 B2 | 3/2013 | Taylor et al. |
| 8,749,489 B2 | 6/2014 | Ito et al. |
| 2001/0008396 A1 | 7/2001 | Komata |
| 2001/0043189 A1 | 11/2001 | Brisebois et al. |
| 2002/0104691 A1 | 8/2002 | Kent et al. |
| 2002/0106614 A1* | 8/2002 | Prince et al. .................. 434/114 |
| 2002/0110237 A1 | 8/2002 | Krishnan |
| 2002/0149570 A1 | 10/2002 | Knowles et al. |
| 2003/0087698 A1 | 5/2003 | Nishiumi et al. |
| 2003/0117371 A1 | 6/2003 | Roberts et al. |
| 2003/0179190 A1 | 9/2003 | Franzen |
| 2003/0206153 A1 | 11/2003 | Murphy |
| 2004/0001589 A1 | 1/2004 | Mueller et al. |
| 2004/0056876 A1 | 3/2004 | Nakajima |
| 2004/0056877 A1 | 3/2004 | Nakajima |
| 2004/0106360 A1 | 6/2004 | Farmer et al. |
| 2004/0114324 A1 | 6/2004 | Kusaka et al. |
| 2004/0164968 A1 | 8/2004 | Miyamoto |
| 2004/0178006 A1 | 9/2004 | Cok |
| 2005/0007339 A1 | 1/2005 | Sato |
| 2005/0007349 A1 | 1/2005 | Vakil et al. |
| 2005/0020325 A1 | 1/2005 | Enger et al. |
| 2005/0030292 A1 | 2/2005 | Diederiks |
| 2005/0057528 A1 | 3/2005 | Kleen |
| 2005/0073506 A1 | 4/2005 | Durso |
| 2005/0088417 A1 | 4/2005 | Mulligan |
| 2005/0110768 A1 | 5/2005 | Marriott et al. |
| 2005/0162408 A1 | 7/2005 | Martchovsky |
| 2005/0212773 A1 | 9/2005 | Asbill |
| 2005/0231489 A1 | 10/2005 | Ladouceur et al. |
| 2005/0253816 A1 | 11/2005 | Himberg et al. |
| 2005/0270444 A1 | 12/2005 | Miller et al. |
| 2005/0285846 A1 | 12/2005 | Funaki |
| 2006/0026521 A1 | 2/2006 | Hotelling et al. |
| 2006/0087479 A1 | 4/2006 | Sakurai et al. |
| 2006/0097991 A1 | 5/2006 | Hotelling et al. |
| 2006/0098148 A1 | 5/2006 | Kobayashi et al. |
| 2006/0118610 A1 | 6/2006 | Pihlaja et al. |
| 2006/0119586 A1 | 6/2006 | Grant et al. |
| 2006/0152474 A1 | 7/2006 | Saito et al. |
| 2006/0154216 A1 | 7/2006 | Hafez et al. |
| 2006/0197753 A1 | 9/2006 | Hotelling |
| 2006/0214923 A1 | 9/2006 | Chiu et al. |
| 2006/0238495 A1 | 10/2006 | Davis |
| 2006/0238510 A1 | 10/2006 | Panotopoulos et al. |
| 2006/0256075 A1 | 11/2006 | Anastas et al. |
| 2006/0278444 A1 | 12/2006 | Binstead |
| 2007/0013662 A1 | 1/2007 | Fauth |
| 2007/0036492 A1 | 2/2007 | Lee |
| 2007/0085837 A1 | 4/2007 | Ricks et al. |
| 2007/0108032 A1 | 5/2007 | Matsumoto et al. |
| 2007/0122314 A1 | 5/2007 | Strand et al. |
| 2007/0130212 A1 | 6/2007 | Peurach et al. |
| 2007/0152983 A1 | 7/2007 | McKillop et al. |
| 2007/0165004 A1 | 7/2007 | Seelhammer et al. |
| 2007/0171210 A1 | 7/2007 | Chaudhri et al. |
| 2007/0182718 A1 | 8/2007 | Schoener et al. |
| 2007/0229233 A1 | 10/2007 | Dort |
| 2007/0236466 A1 | 10/2007 | Hotelling |
| 2007/0236469 A1 | 10/2007 | Woolley et al. |
| 2007/0247429 A1 | 10/2007 | Westerman |
| 2007/0254411 A1 | 11/2007 | Uhland et al. |
| 2007/0257634 A1 | 11/2007 | Leschin et al. |
| 2007/0273561 A1 | 11/2007 | Philipp |
| 2007/0296702 A1 | 12/2007 | Strawn et al. |
| 2007/0296709 A1 | 12/2007 | Guanghai |
| 2008/0010593 A1 | 1/2008 | Uusitalo et al. |
| 2008/0024459 A1 | 1/2008 | Poupyrev et al. |
| 2008/0054875 A1 | 3/2008 | Saito |
| 2008/0062151 A1 | 3/2008 | Kent |
| 2008/0136791 A1 | 6/2008 | Nissar |
| 2008/0138774 A1 | 6/2008 | Ahn et al. |
| 2008/0143693 A1 | 6/2008 | Schena |
| 2008/0150911 A1 | 6/2008 | Harrison |
| 2008/0165139 A1 | 7/2008 | Hotelling et al. |
| 2008/0174570 A1 | 7/2008 | Jobs et al. |
| 2008/0202251 A1 | 8/2008 | Serban et al. |
| 2008/0238448 A1 | 10/2008 | Moore et al. |
| 2008/0248836 A1 | 10/2008 | Caine |
| 2008/0251368 A1 | 10/2008 | Holmberg et al. |
| 2008/0252607 A1 | 10/2008 | De Jong et al. |
| 2008/0266264 A1 | 10/2008 | Lipponen et al. |
| 2008/0286447 A1 | 11/2008 | Alden et al. |
| 2008/0291169 A1 | 11/2008 | Brenner et al. |
| 2008/0297475 A1 | 12/2008 | Woolf et al. |
| 2008/0303796 A1 | 12/2008 | Fyke |
| 2009/0002140 A1 | 1/2009 | Higa |
| 2009/0002205 A1* | 1/2009 | Klinghult et al. .................. 341/33 |
| 2009/0002328 A1* | 1/2009 | Ullrich et al. .................. 345/173 |
| 2009/0002337 A1 | 1/2009 | Chang |
| 2009/0009480 A1 | 1/2009 | Heringslack |
| 2009/0015547 A1 | 1/2009 | Franz et al. |
| 2009/0028824 A1 | 1/2009 | Chiang et al. |
| 2009/0033617 A1 | 2/2009 | Lindberg et al. |
| 2009/0066672 A1* | 3/2009 | Tanabe et al. .................. 345/176 |
| 2009/0085878 A1 | 4/2009 | Heubel et al. |
| 2009/0106655 A1 | 4/2009 | Grant et al. |
| 2009/0115733 A1 | 5/2009 | Ma et al. |
| 2009/0115734 A1 | 5/2009 | Fredriksson et al. |
| 2009/0128376 A1 | 5/2009 | Caine et al. |
| 2009/0128503 A1* | 5/2009 | Grant et al. .................... 345/173 |
| 2009/0129021 A1 | 5/2009 | Dunn |
| 2009/0135145 A1 | 5/2009 | Chen et al. |
| 2009/0140989 A1 | 6/2009 | Ahlgren |
| 2009/0160813 A1 | 6/2009 | Takashima et al. |
| 2009/0167508 A1 | 7/2009 | Fadell et al. |
| 2009/0167509 A1 | 7/2009 | Fadell et al. |
| 2009/0167567 A1 | 7/2009 | Halperin et al. |
| 2009/0167677 A1 | 7/2009 | Kruse et al. |
| 2009/0167704 A1 | 7/2009 | Terlizzi et al. |
| 2009/0174673 A1 | 7/2009 | Ciesla |
| 2009/0174687 A1 | 7/2009 | Ciesla et al. |
| 2009/0181724 A1 | 7/2009 | Pettersson |
| 2009/0182501 A1 | 7/2009 | Fyke et al. |
| 2009/0195512 A1 | 8/2009 | Pettersson |
| 2009/0207148 A1 | 8/2009 | Sugimoto et al. |
| 2009/0215500 A1 | 8/2009 | You et al. |
| 2009/0243998 A1 | 10/2009 | Wang |
| 2009/0250267 A1 | 10/2009 | Heubel et al. |
| 2009/0289922 A1 | 11/2009 | Henry |
| 2009/0303022 A1 | 12/2009 | Griffin et al. |
| 2009/0309616 A1 | 12/2009 | Klinghult |
| 2010/0043189 A1 | 2/2010 | Fukano |
| 2010/0045613 A1 | 2/2010 | Wu et al. |
| 2010/0073241 A1 | 3/2010 | Ayala et al. |
| 2010/0097323 A1 | 4/2010 | Edwards et al. |
| 2010/0103116 A1 | 4/2010 | Leung et al. |
| 2010/0103137 A1 | 4/2010 | Ciesla et al. |
| 2010/0109486 A1 | 5/2010 | Polyakov et al. |
| 2010/0121928 A1 | 5/2010 | Leonard |
| 2010/0141608 A1 | 6/2010 | Huang et al. |
| 2010/0142516 A1 | 6/2010 | Lawson et al. |
| 2010/0162109 A1* | 6/2010 | Chatterjee et al. ............. 715/702 |
| 2010/0171719 A1 | 7/2010 | Ciesla et al. |
| 2010/0171720 A1 | 7/2010 | Ciesla et al. |
| 2010/0177050 A1 | 7/2010 | Heubel et al. |
| 2010/0182245 A1 | 7/2010 | Edwards et al. |
| 2010/0232107 A1 | 9/2010 | Dunn |
| 2010/0237043 A1 | 9/2010 | Garlough |

(56) References Cited

U.S. PATENT DOCUMENTS

| | | |
|---|---|---|
| 2010/0295820 A1 | 11/2010 | Kikin-Gil |
| 2010/0296248 A1 | 11/2010 | Campbell et al. |
| 2010/0298032 A1 | 11/2010 | Lee et al. |
| 2010/0321335 A1 | 12/2010 | Lim et al. |
| 2011/0001613 A1 | 1/2011 | Ciesla et al. |
| 2011/0011650 A1 | 1/2011 | Klinghult |
| 2011/0012851 A1 | 1/2011 | Ciesla et al. |
| 2011/0018813 A1 | 1/2011 | Kruglick |
| 2011/0029862 A1 | 2/2011 | Scott et al. |
| 2011/0043457 A1 | 2/2011 | Oliver et al. |
| 2011/0060998 A1 | 3/2011 | Schwartz et al. |
| 2011/0074691 A1 | 3/2011 | Causey et al. |
| 2011/0120784 A1 | 5/2011 | Osoinach et al. |
| 2011/0148793 A1 | 6/2011 | Ciesla et al. |
| 2011/0148807 A1 | 6/2011 | Fryer |
| 2011/0157056 A1 | 6/2011 | Karpfinger |
| 2011/0157080 A1 | 6/2011 | Ciesla et al. |
| 2011/0163978 A1 | 7/2011 | Park et al. |
| 2011/0175838 A1 | 7/2011 | Higa |
| 2011/0175844 A1 | 7/2011 | Berggren |
| 2011/0181530 A1 | 7/2011 | Park et al. |
| 2011/0193787 A1 | 8/2011 | Morishige et al. |
| 2011/0241442 A1 | 10/2011 | Mittleman et al. |
| 2011/0254672 A1 | 10/2011 | Ciesla et al. |
| 2011/0254709 A1 | 10/2011 | Ciesla et al. |
| 2011/0254789 A1 | 10/2011 | Ciesla et al. |
| 2012/0032886 A1 | 2/2012 | Ciesla et al. |
| 2012/0038583 A1 | 2/2012 | Westhues et al. |
| 2012/0043191 A1 | 2/2012 | Kessler et al. |
| 2012/0056846 A1 | 3/2012 | Zaliva |
| 2012/0062483 A1 | 3/2012 | Ciesla et al. |
| 2012/0080302 A1 | 4/2012 | Kim et al. |
| 2012/0098789 A1 | 4/2012 | Ciesla et al. |
| 2012/0105333 A1 | 5/2012 | Maschmeyer et al. |
| 2012/0120357 A1 | 5/2012 | Jiroku |
| 2012/0154324 A1 | 6/2012 | Wright et al. |
| 2012/0193211 A1 | 8/2012 | Ciesla et al. |
| 2012/0200528 A1 | 8/2012 | Ciesla et al. |
| 2012/0200529 A1 | 8/2012 | Ciesla et al. |
| 2012/0218213 A1 | 8/2012 | Ciesla et al. |
| 2012/0218214 A1 | 8/2012 | Ciesla et al. |
| 2012/0223914 A1 | 9/2012 | Ciesla et al. |
| 2012/0235935 A1 | 9/2012 | Ciesla et al. |
| 2012/0242607 A1 | 9/2012 | Ciesla et al. |
| 2012/0306787 A1 | 12/2012 | Ciesla et al. |
| 2013/0019207 A1 | 1/2013 | Rothkopf et al. |
| 2013/0127790 A1 | 5/2013 | Wassvik |
| 2013/0141118 A1 | 6/2013 | Guard |
| 2013/0215035 A1 | 8/2013 | Guard |
| 2014/0160063 A1 | 6/2014 | Yairi et al. |

FOREIGN PATENT DOCUMENTS

| | | |
|---|---|---|
| CN | 1882460 A | 12/2006 |
| JP | 10255106 | 9/1998 |
| JP | 2006268068 A | 10/2006 |
| JP | 2006285785 A | 10/2006 |
| JP | 2009064357 A | 3/2009 |
| KR | 100677624 B | 1/2007 |
| WO | 2004028955 A | 4/2004 |
| WO | 2008037275 A | 4/2008 |
| WO | 2009002605 A | 12/2008 |
| WO | 2009044027 A2 | 4/2009 |
| WO | 2009067572 A2 | 5/2009 |
| WO | 2009088985 A | 7/2009 |
| WO | 2010077382 A | 7/2010 |
| WO | 2010078596 A | 7/2010 |
| WO | 2010078597 A | 7/2010 |
| WO | 2011003113 A | 1/2011 |
| WO | 2011087816 A | 7/2011 |
| WO | 2011087817 A | 7/2011 |
| WO | 2011112984 A | 9/2011 |
| WO | 2011133604 A | 10/2011 |
| WO | 2011133605 A | 10/2011 |

OTHER PUBLICATIONS

"Sharp Develops and Will Mass Produce New System LCD with Embedded Optical Sensors to Provide Input Capabilities Including Touch Screen and Scanner Functions," Sharp Press Release, Aug. 31, 2007, 3 pages, downloaded from the Internet at: http://sharp-world.com/corporateinews/070831.html.

Jeong et al., "Tunable Microdoublet Lens Array," Optical Society of America, Optics Express; vol. 12, No. 11. May 31, 2004, 7 Pages.

Essilor. "Ophthalmic Optic Files Materials," Essilor International, Ser 145 Paris France, Mar. 1997, pp. 1-29, [retrieved on Nov. 18, 2014]. Retrieved from the internet. URL: <http://www.essiloracademy.eu/sites/default/files/9.Materials.pdf>.

Lind. "Two Decades of Negative Thermal Expansion Research: Where Do We Stand?" Department of Chemistry, the University of Toledo, Materials 2012, 5, 1125-1154; doi:10.3390/ma5061125, Jun. 20, 2012 pp. 1125-1154, [retrieved on Nov. 18, 2014]. Retrieved from the internet. URL: <https://www.google.com/webhp?sourceid=chrome-instant&ion=1&espv=2&ie=UTF-8#q=materials-05-01125.pdf>.

* cited by examiner

USER INTERFACE SYSTEM

CROSS-REFERENCE TO RELATED APPLICATIONS

This application is a continuation of prior U.S. application Ser. No. 12/652,704, filed on 5 Jan. 2010, which is a continuation-in-part of prior U.S. application Ser. No. 12/319,334, filed on 5 Jan. 2009, which is a continuation-in-part of prior U.S. application Ser. No. 11/969,848, filed on 4 Jan. 2008, all of which are incorporated in their entirety by this reference.

This application is also a continuation-in-part of prior U.S. application Ser. No. 13/414,589, filed on 7 Mar. 2012, which is a continuation of U.S. application Ser. No. 12/319,334, filed on 5 Jan. 2009, which is a continuation-in-part of prior U.S. application Ser. No. 11/969,848, filed on 4 Jan. 2008, all of which are incorporated in their entirety by this reference.

This application is also a continuation-in-part of prior U.S. application Ser. No. 11/969,848, filed on 4 Jan. 2008, which is incorporated in its entirety by this reference.

DESCRIPTION OF THE PREFERRED EMBODIMENTS

Figure 1:
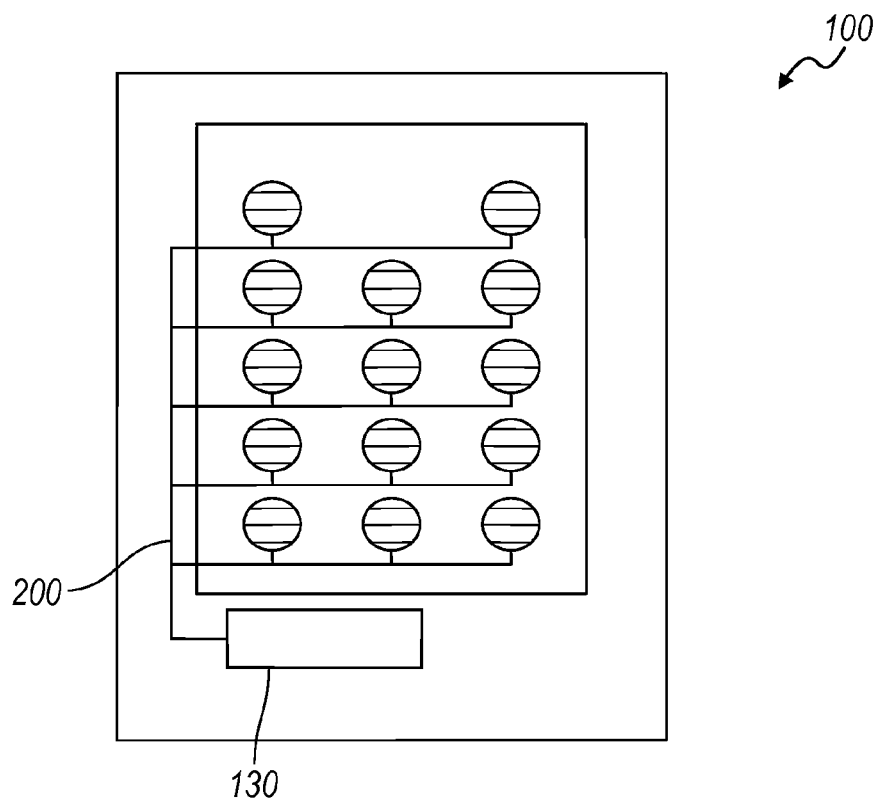
FIG. 1 is a top view of the user interface system of a preferred embodiment.
Figure 2:
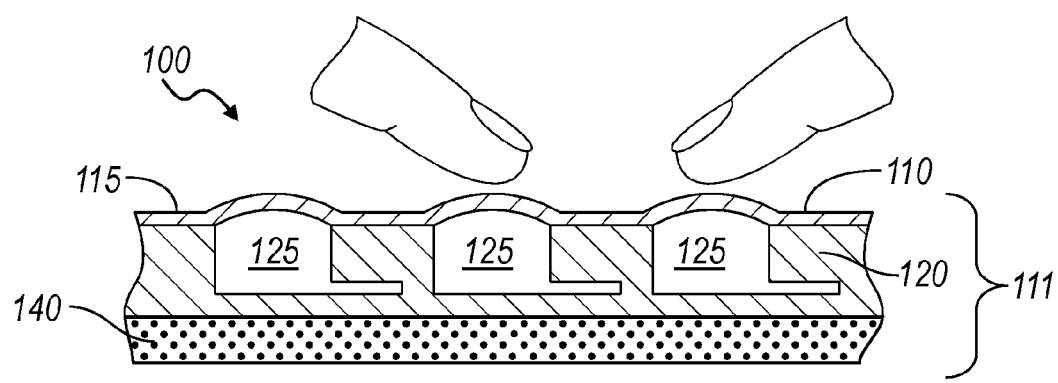
FIG. 2 is a cross-sectional view of the operation of a button array in accordance to the preferred embodiments.

The following description of the preferred embodiments of the invention is not intended to limit the invention to these preferred embodiments, but rather to enable any person skilled in the art to make and use this invention.

As shown in FIGS. 1-4, the user interface system 100 of the preferred embodiment includes: a sheet in that defines a surface 115 on one side and at least partially defines a plurality of cavities 125 on an opposite side, a fluid network 200 coupled to the plurality of cavities 125, a displacement device 130 that is coupled to the fluid network 200 and displaces fluid within the fluid network 200 and expands at least one the plurality of cavities 125 to deform a particular region 113 of the surface 115. The user interface system 100 preferably also includes a sensor 140 that senses a user input at the particular region 113. The touch sensor 140 preferably functions to detect the presence of a user input proximate to the particular region 113 of the surface 115. The touch sensor 140 preferably detects the presence of a user touch by detecting a force that inwardly deforms the deformed particular region 113 or any other portion of the surface 115, but may alternatively detect the presence of a user touch by detecting the presence of the finger at a location proximate to the particular region 113. The touch sensor 140 may be a capacitive sensor, a resistive sensor, a pressure sensor, or any other suitable type of sensor. The user interface system 100 may also include a display (that may or may not be integrated with the touch sensor 140) coupled to the sheet 111 and adapted to output images to the user. As shown in FIGS. 4a and 4b, the preferred embodiments may also include a processor 300 that controls the expansion of the cavities 125.

The user interface system 100 of the preferred embodiments has been specifically designed to be used as the user interface for an electronic device, more preferably in an electronic device that benefits from an adaptive user interface. The electronic device, which may or may not include a display, may be incorporated into an automotive console, a desktop computer, a laptop computer, a tablet computer, a television, a radio, a desk phone, a mobile phone, a PDA, a personal navigation device, a personal media player, a camera, a watch, a remote, a mouse, a trackpad, or a keyboard. The user interface system 100 may, however, be used as the user interface for any suitable device that interfaces with a user in a tactile and/or visual manner. The user interface system 100 is preferably used on a planar surface, but may also be used on a non-planar surface, for example, around the rounded grip of a steering wheel or around the edge rim of a cellular phone. The surface 115 of the user interface system 100 preferably remains flat until a tactile guidance is to be provided at or in substantial proximity to the location of the particular region 113. The surface 115 of the user interface system 100 may also be deformed when a user input is required. At that time, the displacement device 130 expands the cavity 125 to expand a particular region 113 outward, forming a deformation that may be felt by a user, and providing tactile guidance for the user. The expanded particular region 113 preferably also provides tactile feedback to the user when they apply force onto the particular region 113 to provide input. However, any other arrangement of the user interface system 100 suitable to providing tactile guidance and/or detecting user input may be used.

The sheet in of the preferred embodiment functions to define a surface 115 on one side and at least partially defines a plurality of cavities 125 on an opposite side. The sheet 111 preferably includes a layer 110 that defines the surface 115 and a substrate 120 that supports the layer no and at least partially defines the plurality of cavities 125. The sheet 111 is preferably similar to the sheet and layer taught in U.S. application Ser. No. 12/319,334, but may alternatively be any suitable device that a sheet 111 that defines a surface 115 on one side and at least partially defines a plurality of cavities 125 on an opposite side.

Figure 20A:
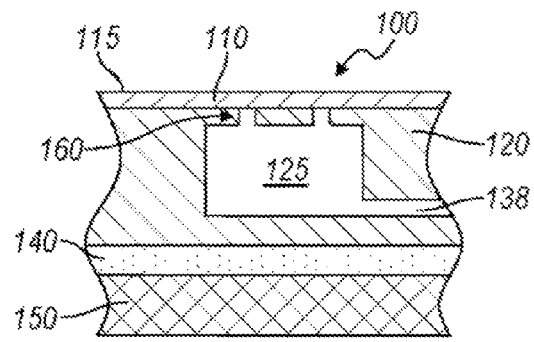
FIGS. 20a and 20b are cross-sectional views of a support member between the layer and the substrate, with the cavity in a retracted volume setting and an expanded volume setting, respectively.
Figure 20C:
FIG. 20c is a top view of the support member.
Figure 20B:
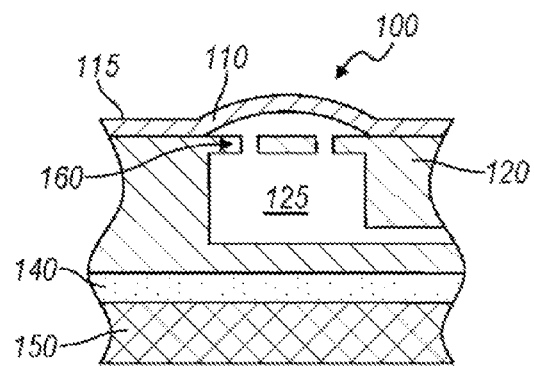
Figure 20D:
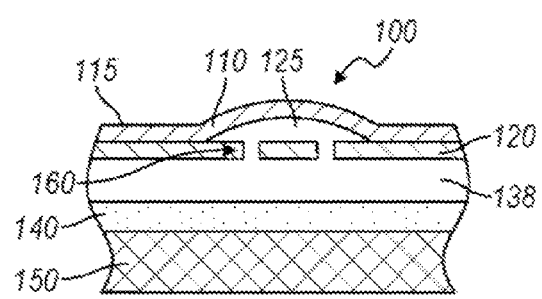
FIG. 20d is a cross-sectional view of an alternative support member that partially defines the cavity.

As shown in FIGS. 20a and 20b, the substrate 120 may include a lattice-like support member 160 under the particular region of the surface 115. When the cavity 125 is expanded and the deformation is present in the surface 115, the support member 160 functions to prevent a user from "pressing too far" into the deformation below the plane of the surface 115. When the cavity 125 is not expanded and the deformation is not present in the surface 115, the support member 160 functions to reduce (or potentially eliminate) the user from feeling "divots" in the surface 115 when swiping a finger across the surface 115. As shown in FIG. 20c, the support member 160 preferably includes holes or channels that allow for the expansion of the cavity 125 and the deformation of the surface 115. The support member 160 is preferably integrally formed with the substrate 120, but may alternatively be formed with the layer 110 or may be separately formed and later attached to the substrate 120. Finally, as shown in FIG. 20d, the support member 160 may alternatively partially define the cavity 125. The substrate 120 is preferably rigid, but may alternatively be flexible in one or more directions. The substrate 120—if located above the display 150—is preferably optically transparent, but may—if located below the display 150 or if bundled without a display 150—be translucent or opaque. The substrate 120 is preferably made from a material including polymers or glass, for example, elastomers, silicon-based organic polymers such as polydimethylsiloxane (PDMS), thermoset plastics such as polymethyl methacrylate (PMMA), and photocurable solvent resistant elastomers such as perfluropolyethers. The substrate 120 may, however, be made of any suitable material that supports the layer 110 and at least partially defines the cavity 125. In the preferred version, the substrate 120 is a single homogenous layer approximately 1 mm to 0.1 mm thick and can be manufactured using well-known techniques for microfluid arrays to create one or more cavities and/or micro channels. In alternative versions, the substrate 120 may be constructed using multiple layers from the same material or from different suitable materials.

Figure 3A:
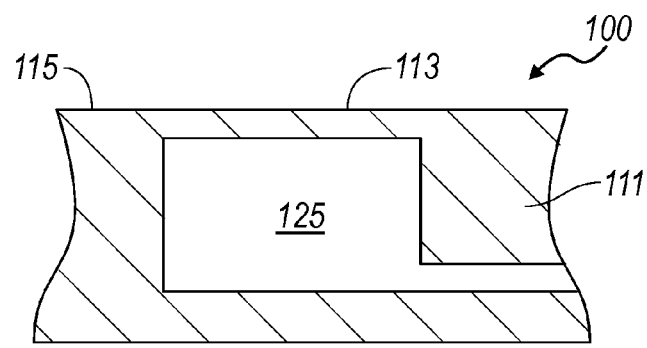
FIGS. 3a, 3b, and 3c are cross-sectional views of the retracted, extended, and user actuated modes of the preferred embodiments, respectively.
Figure 3B:
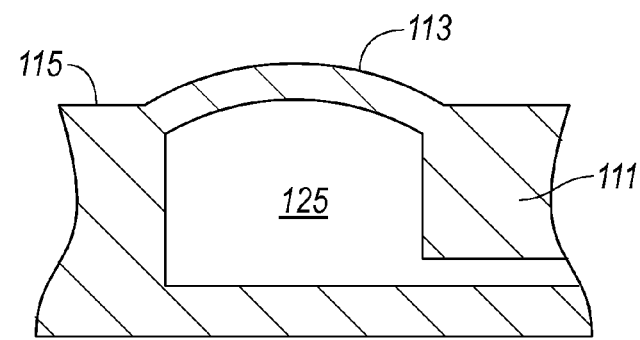
Figure 3C:
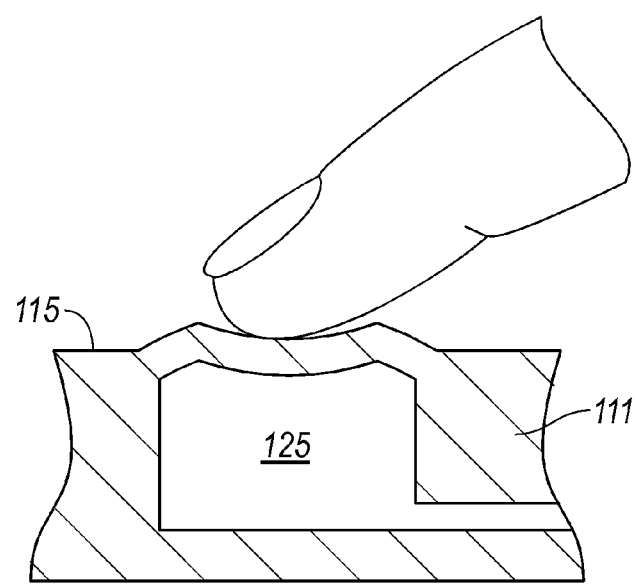

As shown in FIGS. 3a, 3b and 3c, the cavities 125 of the preferred embodiment each function to hold a fluid and to have at least two volumetric settings: a retracted volume setting (shown in FIG. 3a) and an expanded volume setting (shown in FIG. 3b). When in the expanded volume setting, the user may inwardly deform the particular region 113 to provide a user input (shown in FIG. 3c). The fluid is preferably a liquid (such as water, glycerin, or ethylene glycol), but may alternatively be a gas (such as air, nitrogen, or argon) or any other substance (such as a gel or aerogel) that expands the cavity 125 and deforms the surface 115. In the expanded volume setting, the cavity 125 expands above the plane of the surface 115, thereby deforming a particular region of the surface 115. The deformation of the particular region 113 functions to provide tactile guidance and/or tactile feedback on the surface 115 for the user. The deformation of the particular region 113 also preferably functions to inform the user of the type of input the deformation represents. For example, the deformation of the particular region 113 may be of a shape that indicates the type of input that the deformation represents. Alternatively, the sheet 111 may include tactile instructions, for example, a pattern of beads or substantially small protrusions that may be felt by the user on the particular region 113 that indicate the type of input the deformation represents. The tactile instructions on the particular region 113 may alternatively be any other type of feature that is able to be felt tactilely by the user.

As shown in FIGS. 4-5, the plurality of cavities 125 and the displacement device 130 are preferably coupled to the fluid network 200, which functions to allow fluid to communicate through the user interface system 100 to expand and retract the plurality of cavities 125. The fluid network 200 preferably includes a channel 138 that preferably couples each of the plurality of cavities 125, either directly or indirectly (shown in FIG. 6), to the displacement device 13o. The channel 138 may be composed of a plurality of segments (or "branches") that couple to each of the plurality of cavities 125 and the displacement device 130. The fluid network 200 may also include a reservoir 132 that functions to contain a volume of the fluid.

Each of the plurality of cavities 125 preferably function substantially similarly and are expanded and retracted by fluid displaced by the displacement device 130. In some variations, the plurality of cavities 125 may be substantially similar to each other. In other variations, the plurality of cavities 125 may have differences in overall geometry, volume, expansion properties, and/or retraction properties. The plurality of cavities 125 preferably provide the user interface system 100 with the ability to adapt to a variety of user interface scenarios, for example, to user interface scenarios that require more than one possible input (e.g. "Yes" or "No").

Figure 4A:
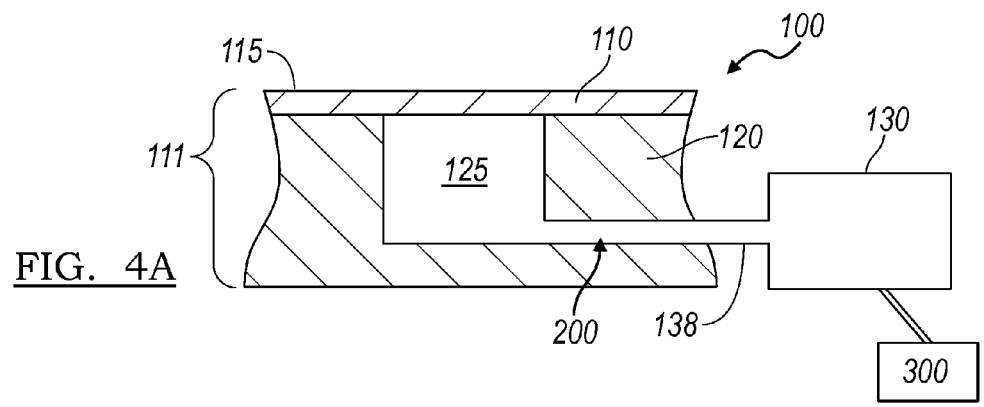
FIGS. 4a and 4b are cross-sectional views of the layer, the substrate, the cavity, the touch sensor, the display, a processor, and a displacement device that modifies the volume of fluid in the cavity, with the cavity in a retracted volume setting and an expanded volume setting, respectively.
Figure 4B:
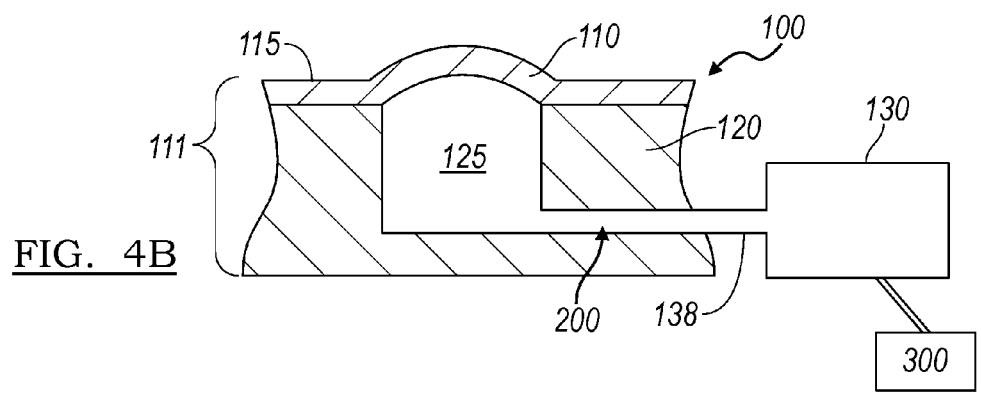
Figure 5A:
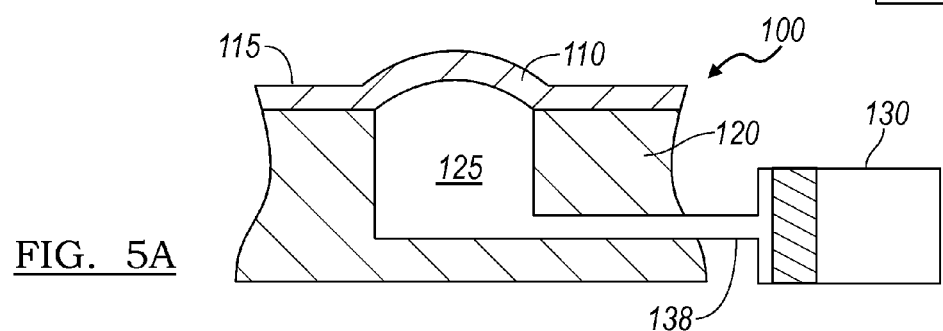
FIGS. 5a, 5b, and 5c are schematic views of the sheet, the cavity, and a displacement device of a first example, second, and third variation, respectively.
Figure 5B:
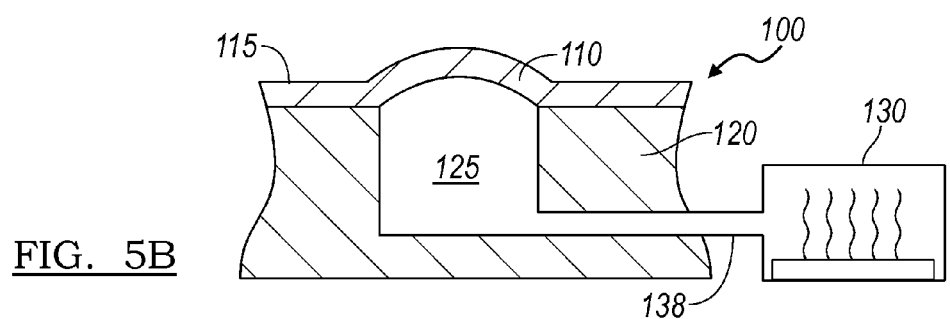
Figure 5C:
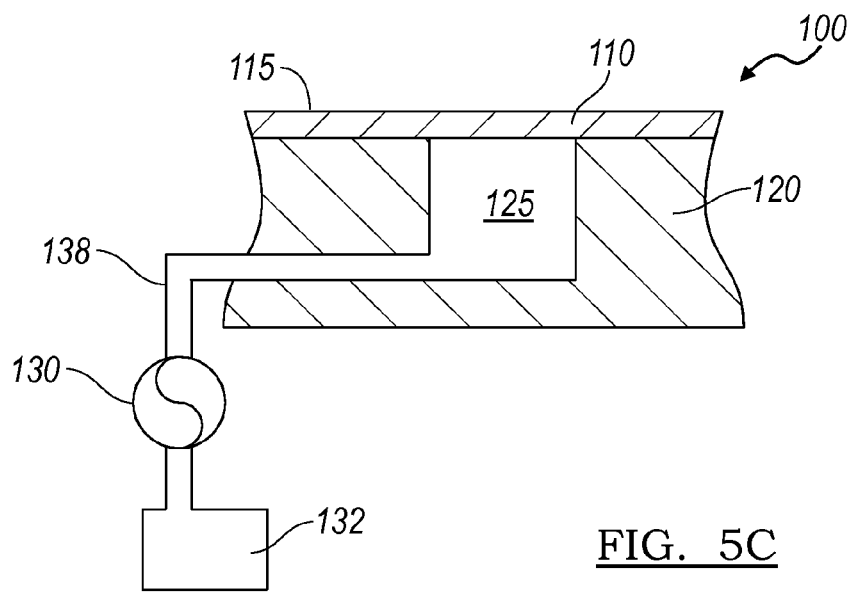

As shown in FIGS. 4a and 4b, the displacement device 130 of the preferred embodiment functions to expand the cavity 125, subsequently deforming the particular region 113 of the surface 115. The displacement device 130 preferably functions to both expand and retract the cavity 125. In other words, the displacement device 130 functions to increase the volume of fluid within the cavity 125 and decrease the volume of fluid (or "drain" fluid) in the cavity 125. The user interface system 100 may, however, use another device or method to decrease the volume of fluid. The displacement device 130 may be one of several variations. In a first variation, as shown in FIG. 5a, the displacement device 130 includes a linear actuator that displaces fluid in between the displacement device 130 and a cavity 125. In a second variation, as shown in FIG. 5b, the displacement device 130 includes a heating element (for example, a resistive heater composed of a material such as TaN or Nichrome) that functions to expand the volume of fluid contained within a cavity 125. In a third variation, as shown in FIG. 5c, the displacement device 130 includes a micro-pump 134 (for example, pump #MDP2205 from ThinXXs Microtechnology AG of Zweibrucken, Germany or pump #mp5 from Bartels Mikrotechnik GmbH of Dortmund, Germany) that pumps fluid from a reservoir 132 to a cavity 125. The micro-pump 134 preferably pumps fluid between the cavity 125 and the reservoir 132. In a variation of the fluid where the fluid is ambient air, the pump 134 may function to pump air from the surrounding environment into the cavity 125. The third variation may alternatively include two micropumps 134, a first to pump fluid into the cavity 125 from the reservoir 132 and a second to pump fluid from the cavity 125 into the reservoir 132. However, any other suitable type of displacement device 130 may be used.

Although the cause of the deformation of a particular region 113 of the surface 115 has been described as a modification of the volume of the fluid in the cavity 125, it is possible to describe the cause of the deformation as an increase in the pressure below the surface 115 relative to the pressure above the surface 115. When used with a mobile phone device, an increase of approximately 0.1-10.0 psi between the pressure below the sheet no relative to the pressure above the sheet 110, is preferably enough to deform a particular region 113 of the surface 115. When used with this or other applications, however, the modification of the pressure may be increased (or possibly decreased) by any suitable amount. For example, when the user interface system 100 is used in environments with different ambient pressures such as in an airplane where ambient pressure is lower than that closer to sea level, the displacement device 130 may be adjusted to provide less of a pressure change to achieve the same level of expansion of the cavity 125. Additionally, each of the plurality of cavities 125 may expand with a different pressure change; for example, a first cavity 125a may expand with a change of 0.1 psi while a second cavity 125b may expand with a change of 0.5 psi.

Figure 14:
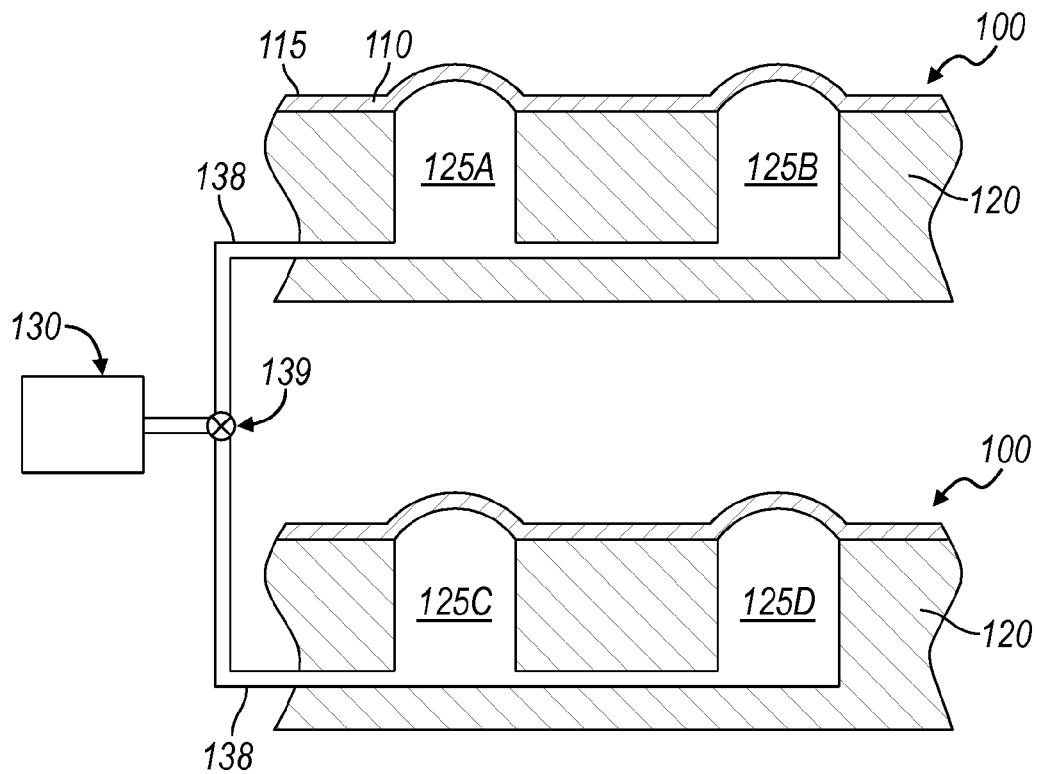
FIG. 14 is a schematic view of the expansion of the cavities of the third preferred embodiment.

As mentioned above, the user interface system 100 preferably includes a plurality of cavities 125. The displacement device 130 preferably expands the plurality of cavities 125 in one of four preferred embodiments. In a first preferred embodiment, as shown in FIGS. 6-7, the displacement device 130 preferably expands a first cavity 125a and a second cavity 125b concurrently. In a second preferred embodiment as shown in FIGS. 8-9, the displacement device 130 preferably selectively expands at least one of a first cavity 125a and a second cavity 125b. The displacement device 130 may function to both expand one of the first and second cavities 125a and 125b at one time and expand both the first and second cavities 125a and 125b at another time. In a third preferred embodiment, as shown in FIGS. 14-15, the displacement device 130 preferably selectively expands at least one of a first group of cavities 125 and a second group of cavities 125 at one time. Similar to the second preferred embodiment, the displacement device 130 of the third preferred embodiment may function to both expand one of the first and second groups of cavities 125 at one time and expand both the first and second groups of cavities 125 at one time. The third preferred embodiment may alternatively be described as a combination of the first and second preferred embodiments because each of the cavities 125 within a group of cavities selected for expansion are expanded at one time. In a fourth preferred embodiment, as shown in FIGS. 19a-19d, the displacement device 130 preferably expands a first cavity 125a and one of a second cavity 125b and third cavity 125c at one time. The arrangement of the second and third cavities is similar to the second preferred embodiment because the second and third cavities are selectively expanded by the displacement device, and the arrangement of the first cavity is similar to the first preferred embodiment because the first cavity is concurrently expanded with one of the second or third cavities, thus, the fourth preferred embodiment may also be described as a combination of the first and second preferred embodiments.

1. First Preferred Embodiment: Concurrent Expansion

Figure 6A:
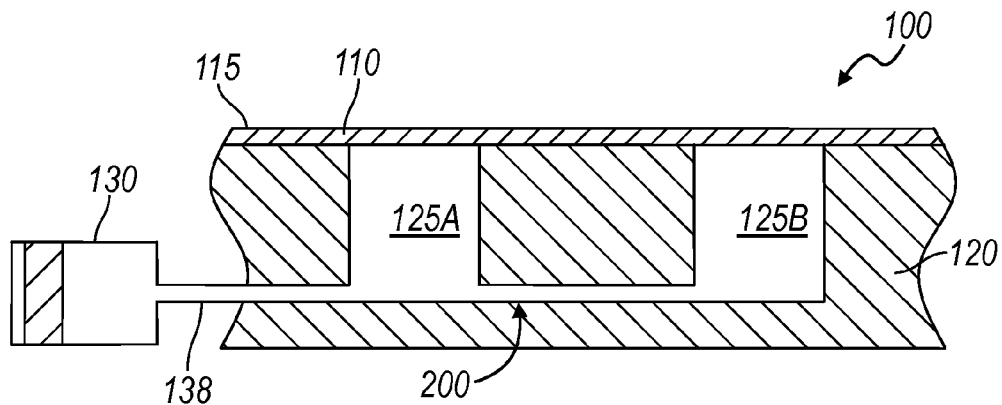
FIGS. 6a and 6b are schematic views of the retracted and extended modes of the cavities of the first preferred embodiment, respectively.
Figure 6B:
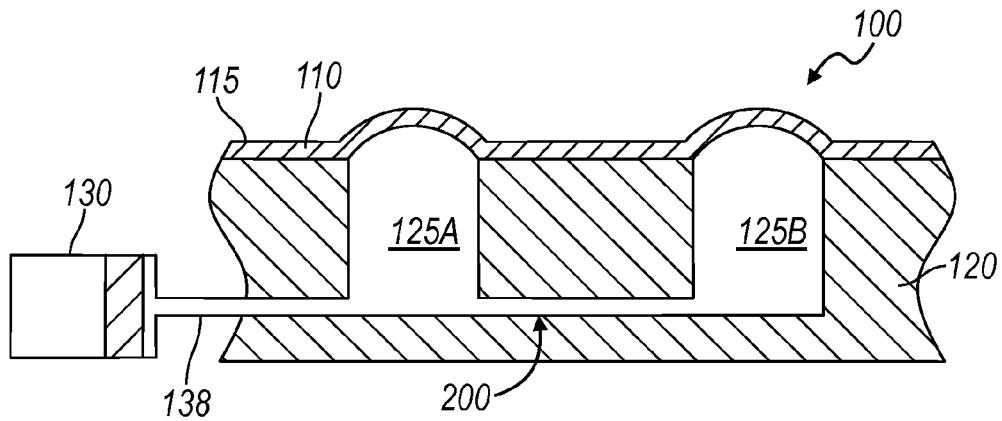
Figure 7A:
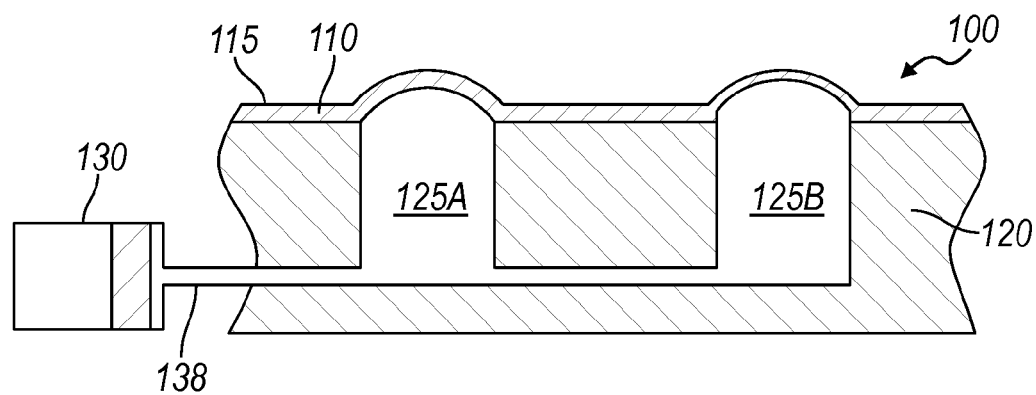
FIGS. 7a and 7b are schematic views of geometric variations of the first preferred embodiment.
Figure 7B:
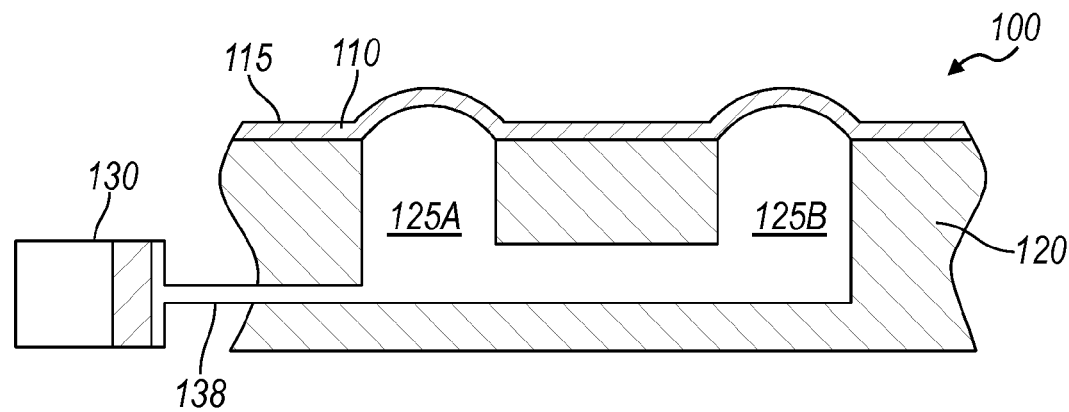
Figure 8A:
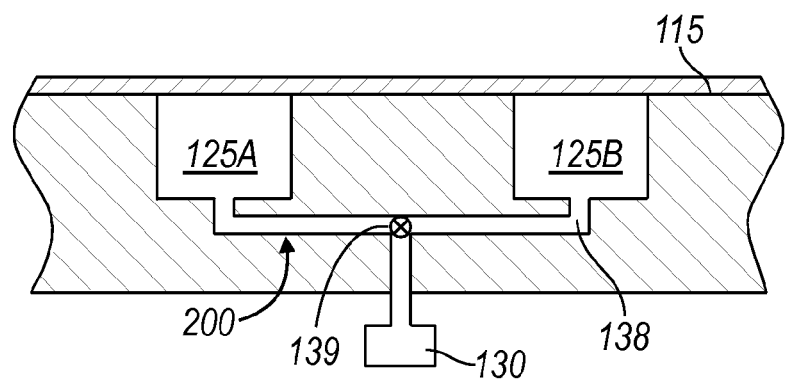
FIGS. 8a, 8b, 8c, and 8d are schematic views of the different expansion modes of the cavities of the second preferred embodiment.
Figure 8B:
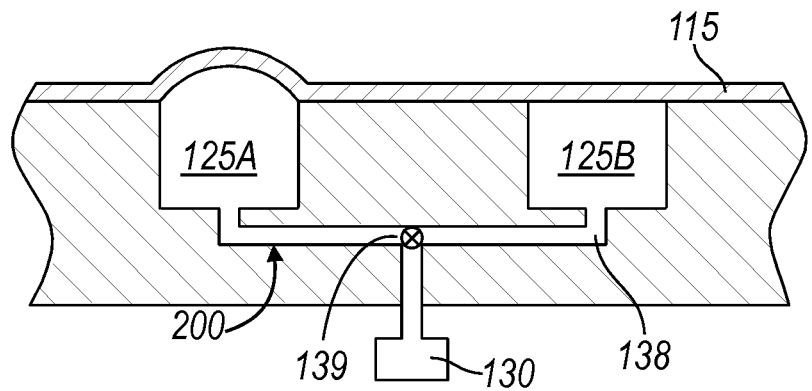
Figure 8C:
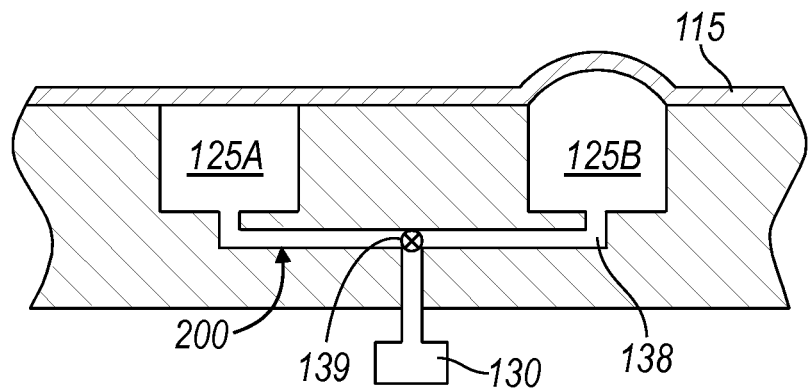
Figure 8D:
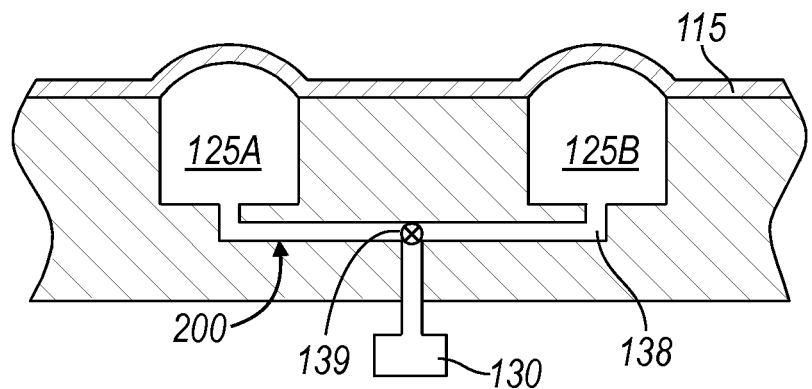

In the first preferred embodiment, as shown in FIGS. 6a and 6b, a first cavity 125a and a second cavity 125b are preferably expanded concurrently. A channel 138 of the fluid network 200 preferably couples the first cavity 125a and the second cavity 125b with each other and to the displacement device 130. The channel 138 of the first preferred embodiment is preferably straight, but may alternatively be of a circular shape, zigzag shape, spiral shape, or any other suitable shape to route between the displacement device 130 and the cavity 125. The fluid displaced by the displacement device preferably travels through the channel 138 to each of the first and second cavities 125a and 125b. The displacement device 130 may be oriented relative to the first and second cavities 125a and 125b such that the fluid travels to the first cavity 125a and then to the second cavity 125b. In this orientation, the pressure within the fluid preferably builds up approximately uniformly between the first and second cavities 125a and 125b until a pressure point where both the first and second cavities 125a and 125b start expansion at approximately the same time and at the same rate. Because the fluid travels farther to reach the second cavity 125b, the increased pressure necessary to travel to the second cavity 125b and expand the second cavity 125b may cause the second cavity 125b to start expansion at a different time or rate than the first cavity 125a. To compensate for this potential difference in pressure, the geometry of the channel 138 and/or the second cavity 125b may be adjusted, as shown in FIGS. 7a and 7b. As shown in FIG. 7a, the portion of the layer 110 that is deformed when the second cavity 125b is expanded is thinner relative to the portion of the layer no that is deformed when the first cavity 125a is expanded. This may decrease the pressure necessary to expand the second cavity 125b and may allow the second cavity 125b to expand at the same time and rate as the first cavity 125a. Alternatively, as shown in FIG. 7b, the size of the channel 138 leading to the second cavity 125 may be increased in size (in diameter and/or cross sectional area) to decrease the pressure necessary for fluid to travel through the channel 138. Alternatively, a second displacement device 130 may be arranged on the opposite side of the cavities 125a and 125b relative to the first displacement device, decreasing the maximum distance between a cavity 125 to any one displacement device 130. The second displacement device 130 may function to displace fluid into the cavities 125, but may also function to provide a backwards pressure to assist the first displacement device 130 in displacing fluid through the fluid network. In other words, the first displacement device 130 may push fluid through the channel 138 in a direction and the second displacement device 130 may pull fluid through the channel 138 in the same direction. However, the first and second displacement devices 130 may cooperate to expand the plurality of cavities 125 in any other suitable method. However, any other geometry or method of allowing both the first and second cavities 125a and 125b to start expansion substantially at the same time and at the same rate may be used. The first and second cavities 125a and 125b may also be allowed to start expansion at different times.

Alternatively, the first and second cavities 125a and 125b may each be connected directly to the displacement device 130 and not each other. For example, a first channel 138 may couple only the first cavity 125a to the displacement device 130 and a second channel 138 may couple only the second cavity 125b to the displacement device 130. The first channel 138 and the second channel 138 are preferably of similar geometry and the first and second cavities 125a and 125b are preferably of similar distance away from the displacement device 130. In this orientation, the differences in pressure between expansion of the first cavity 125a and the second cavity 125b may be decreased.

The geometry of the channel 138 and the first and second cavities 125a and 125b may alternatively be used to prevent the first and second cavities 125a and 125b from having substantially identical expansion properties. For example, the pressure necessary to expand the second cavity 125b may be increased to cause the second cavity 125b to expand at a time and a rate different from the first cavity 125a. This method may also be used to decrease the apparent response time of the user interface system 100. The time necessary for the displacement device 130 to provide the necessary pressure to expand both first and second cavities 125a and 125b together may be less than the time necessary for the displacement device 130 to provide the necessary pressure to expand just the first cavity 125a, and thus, if the first cavity 125a is expanded and then the second cavity 125b is expanded, the response time of the user interface system may seem to decrease to the user, potentially providing a better user experience.

The user interface of the first preferred embodiment preferably includes processor that controls the displacement device 130. The processor preferably actuates the displacement device 130 to displace a volume of fluid that expands the first and second cavities 125a and 125b to a desired amount. The displacement device 130 may displace fluid at a constant rate, allowing the processor to control the volume of fluid that is displaced into the cavities 125 by the length of time the displacement device 130 is actuated. Alternatively, a flow sensor may be coupled to the channel 138 to detect the volume of fluid that has passed through the channel 138. A pressure sensor may also be used to detect the pressure of fluid within a cavity 125. The processor preferably also actuates the displacement device 130 to displace a volume of fluid at a rate that expands the first and second cavities 125a and 125b at a desired rate. Alternatively or additionally, a temperature sensor may be used to detect the temperature of the fluid, which may affect the volume, viscosity, or any other suitable characteristic of the fluid. However, the processor may control any other aspect of the displacement device 130.

2. Second Preferred Embodiment: Selective Expansion

Figure 9A:
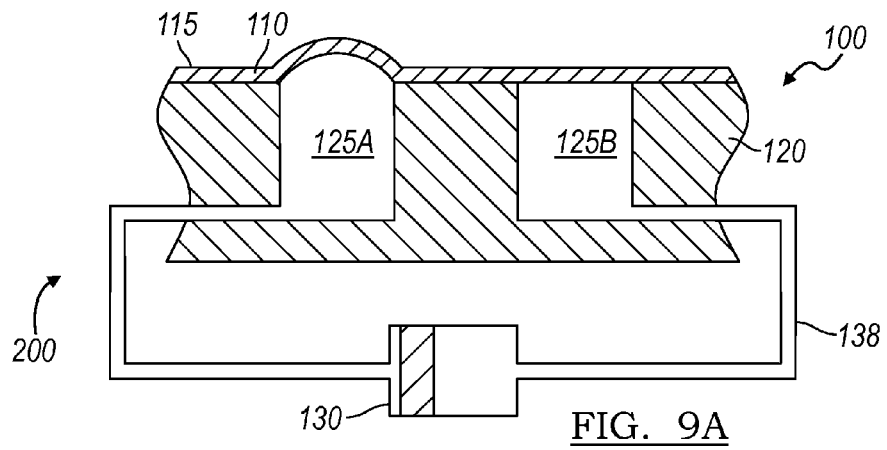
FIGS. 9a, 9b, and 9c are schematic views of the different expansion modes of the cavities of a variation of the second preferred embodiment.
Figure 9B:
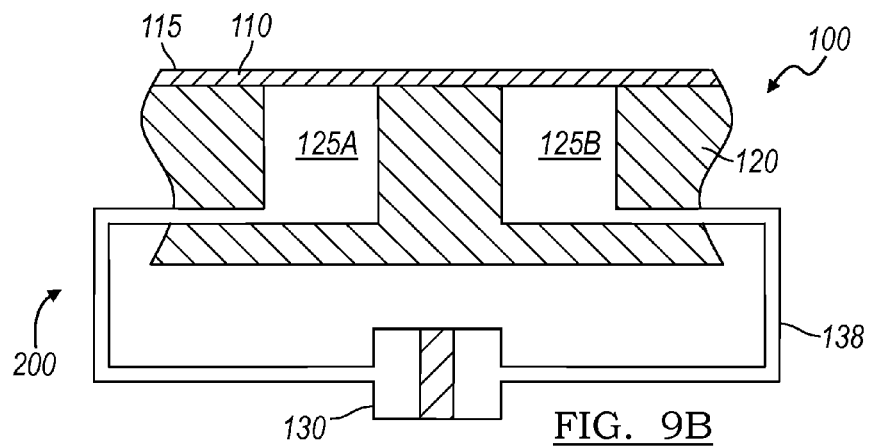
Figure 9C:
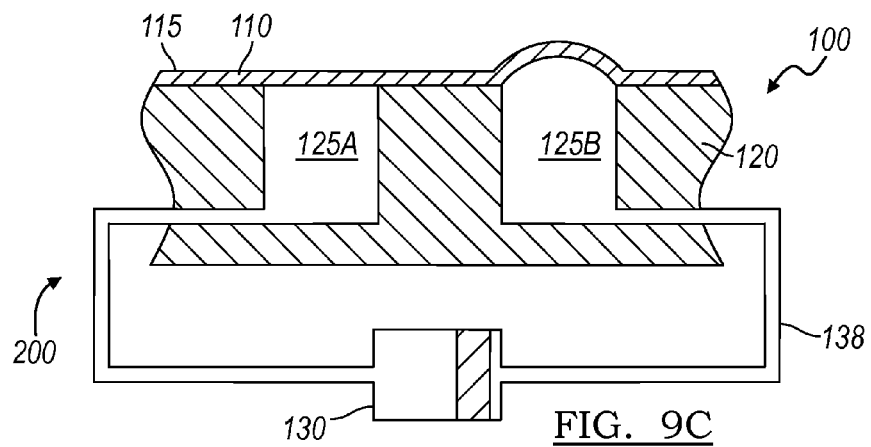

In the second preferred embodiment, as shown in FIGS. 8a-8d, the first cavity 125a and second cavity 125b are selectively expanded. The displacement device 130 of the second preferred embodiment preferably expands the first and second cavities 125a and 125b in two modes: a first mode where only one of the first and second cavities 125a and 125b is expanded, and a second mode where both of the first and second cavities 125a and 125b are expanded. Alternatively, as shown in FIGS. 9a-9c, the displacement device 130 may expand only one of the first and second cavities 125a and 125b at any one time. The displacement device 130 for this variation of the second preferred embodiment may be of the linear actuator type that displaces a volume of fluid between the first and second cavities 125a and 125b. As shown in FIGS. 8-9, a channel 138 preferably couples the first cavity 125a and the second cavity 125b to the displacement device 130. The channel 138 preferably forms a T-junction (or Y-junction) between the displacement device 130 and the two cavities 125a and 125b, such that a fluid displaced by the displacement device 130 may travel down one or both of two paths to one or both of the cavities 125a and 125b, respectively, but may alternatively be in any other suitable orientation. The first and second cavities 125a and 125b are preferably not directly connected to each other through a channel 138, but only indirectly connected to each other through their connection to the same displacement device. The fluid network 200 of the second preferred embodiment preferably also includes a valve 139 that functions to direct the fluid that is displaced by the displacement device 130 into either or both of the first and second cavities 125a and 125b.

Figure 10A:
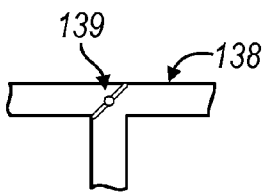
FIGS. 10a and 10b are schematic representations of a first variation of the valve of the preferred embodiments.
Figure 10B:
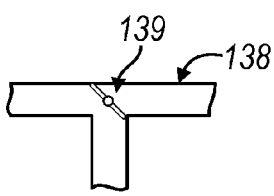
Figure 10C:
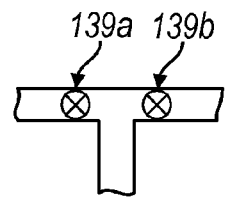
FIG. 10c is a schematic representation of a second variation of the valve of the preferred embodiments.
Figure 11A:
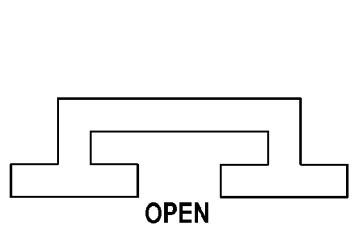
FIGS. 11a and 11b, 12a and 12b, and 13a and 13b are schematic representations of the OPEN and CLOSED states of a first, second, and third example of the valve of the preferred embodiments, respectively.
Figure 11B:
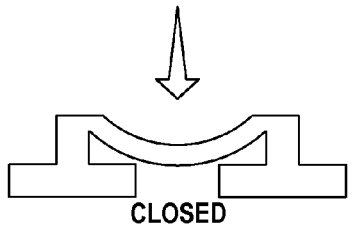
Figure 12A:
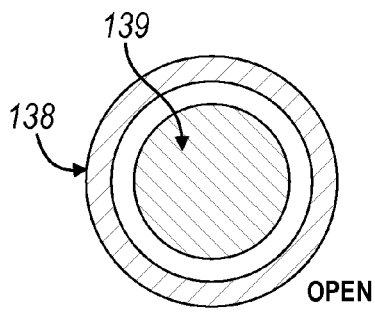
Figure 12B:
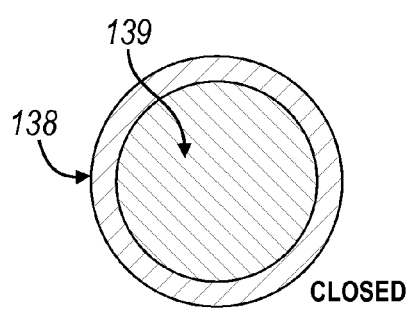
Figure 13A:
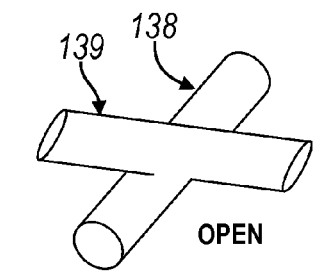
Figure 13B:
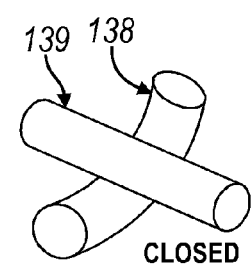

The valve 139 is preferably of type suitable for a microfluidic system. As mentioned above, the channel 138 preferably forms a T-junction. The valve 139 is preferably placed at the T-junction such that the valve 139 may direct fluid displaced by the displacement device 130 into one or both of the cavities 125a and 125b. As shown in FIGS. 10a and 10b, the valve 139 may be a directional valve that directs fluid to a first path (towards the first cavity 125a) at a first orientation and to a second path (towards the second cavity 125b) at a second orientation. The valve 139 of this variation may include a valve flap that is actuated by a memory material such as Nickel Titanium (NiTi) that may direct the valve flap into one of two or more directions to direct flow. However, any other suitable directional valve may be used. Alternatively, the valve 139 may be of a bi-state type valve with an OPEN state that allows passage of fluid through the channel 138 and a CLOSED state that prevents passage of fluid through the channel 138. In this variation, the valve 139 may include a first portion that prevents flow of fluid in a first direction and a second portion that prevents flow of fluid in a second direction, as shown in FIG. 10c. The first portion 139a and the second 139b may each be of a bi-state type valve. The valve 139 of this variation may alternatively be an electrically actuated valve, such as a valve flap coupled to a memory material such as Nickel Titanium (NiTi) that may be actuated with the electrical current. The valve 139 may alternatively be activated by an electromagnetic field. For example, as shown in FIGS. 11a and 11b, the valve 139 of this variation may include a valve diaphragm and a valve base, both composed of an electrically conductive material. A voltage is applied to both the valve diaphragm and the valve, causing an electrostatic force to bring the valve diaphragm to the valve base (as shown in FIG. 11b) and closing the valve. The valve 139 may also be temperature actuated, as shown in FIGS. 12a and 12b. For example, the valve 139 may include a expandable portion inside the channel 138 that allows fluid to pass through at low temperatures (as shown in FIG. 12a in a cross sectional view of the channel 138) and expands at relatively high temperatures (as shown in FIG. 12b in a cross sectional view of the channel 138) to block fluid flow. In another example, the expandable portion may prevent fluid to pass through at low temperatures and then expands at relatively high temperatures to allow fluid flow. In another example, the valve may include a plunger that is actuated by a solenoid, a magnetic field, and/or a spring to block/allow passage of fluid through the channel. The valve 139 may alternatively be a pressure actuated valve, as shown in FIGS. 13a and 13b. For example, the valve 139 may include an expandable component that is placed across the channel 138. Upon expansion of the expandable component by an increase of pressure through the expandable component, pressure is placed onto the channel 138 and the channel 138 collapses, preventing flow of fluid through the channel 138. Alternatively, the valve 139 may include a pressure component that collapses the channel 138 until a certain pressure is provided within the channel 138 to push against the pressure component, opening up the channel 138 and allowing fluid to flow through. An alternative example to a pressure actuated valve 139 may also be a manually activated valve. For example, a user may actuate the valve 139 by applying pressure to a location along the surface 115. However, any other suitable type of valve 139 for a micro fluidic channel 138 may be used.

In the variation of the valve 139 that is a bi-state valve, the valve 139 is preferably in the CLOSED state until actuated into the OPEN state by, for example, by the processor 300. Because the cavity 125 is preferably maintained in either the expanded or retracted states, once the suitable volume of fluid is contained within the cavity 125, the valve preferably defaults to a CLOSED state to prevent further fluid flow of fluid to and from the cavity 125. The CLOSED state of the valve preferably does not require additional energy, allowing the user interface system 100 to save on power consumption. However, the OPEN and CLOSED states of the valve may alternatively be of any other orientation.

The valve 139 is preferably arranged inside the channel 138 to direct flow of fluid within the channel 138, but may alternative be arranged outside of the channel 138. For example, the valve 138 may be of a ring shape that surrounds the outer circumference of the channel 138. As the valve 138 expands (for example, by material expansion from a higher temperature or increased pressure from within the ring), the ring preferably squeezes the channel 138, decreasing the diameter of the channel 138 and constricting flow. The valve 139 may also include a flow sensor to detect the volume of fluid that has passed through the valve 139 to regulate the expansion and retraction of the cavities 125*a* and 125*b*. The valve 139 is preferably arranged within the sheet 111, as shown in FIGS. 8*a*-8*d*, but may alternatively be located outside of the sheet 111, as shown in FIG. 14. However, any other suitable orientation of the valve 139 may be used.

Alternatively, the displacement device 130 may include two fluid outlets and may function to displace fluid to a first fluid outlet to a first channel 138 coupled to the first cavity 125*a* and displace fluid to a second fluid outlet to a second channel 138 coupled to a second cavity 125*b*. In this variation, the selective expansion of the first and second cavities 125*a* and 125*b* is a direct result of the displacement of fluid caused by the displacement device 130 and not the result of redirecting the displaced fluid. The user interface system may also include a first displacement device 130 that functions to displace fluid to the first cavity 125*a* and a second displacement device 130 that functions to displace fluid to the second cavity 125*b*. Alternatively, the first and second displacement devices 130 may cooperate to control the flow of fluid into one or both of the cavities 125*a* and 125*b*. For example, in the variation where each of the plurality of cavities 125 expands with a different volume or pressure change, the first displacement device 130 may provide the volume or pressure change necessary to expand a first cavity 125*a* and the second displacement device 130 may provide the additional volume or pressure change necessary to expand a second cavity 125*b*. The first and second displacement devices 130 are preferably identical, but may alternatively have different fluid displacement properties to accommodate to different relative locations of the first and second cavities 125*a* and 125*b* and/or different geometries of the first and second cavities 125*a* and 125*b*. However, any other suitable arrangement of displacement devices 130 and first and second cavities 125*a* and 125*b* may be used.

The second preferred embodiment preferably includes a processor that controls the displacement device 130 and the valve 139. The processor preferably determines if only one or both of the cavities 125*a* and 125*b* are to be expanded and actuates the displacement device 130 to displace the suitable volume of fluid to expand one or both of the cavities 125*a* and 125*b* to the desired amount as well as actuates the valve 139 to direct the fluid to the desired cavities 125*a* and 125*b*. In the second preferred embodiment, the volume of fluid that is displaced may be controlled by controlling the length of time that the displacement device 130 is actuated as described in the first embodiment, but may also be controlled by actuation of the valve 139 to direct fluid in any one direction. For example, in the bi-state variation of the valve 139, the fluid flow through the channel 138 may be a constant rate and the processor may actuate the valve 139 into the OPEN state for a period of time to allow the desired volume of fluid to flow through. Alternatively, the system 100 may include a flow sensor located within the cavity 125, valve 139, the channel 138, and/or the reservoir 133 that detects the increase in volume of the fluid and/or the flow of fluid into the cavity 125 to determine whether the adequate amount of flow or change in volume and/or pressure has been completed. Alternatively, the displacement device 130 may function to provide a constant pressure within the fluid network 200. Once a valve 139 is in the OPEN state, fluid may flow into the cavity 125 corresponding to the valve 139 and the overall pressure within the fluid network 200 may decrease and the displacement device 130 is then actuated to increase the pressure within the fluid network 200 to the desired pressure, filling the cavity 125. To drain fluid from an expanded cavity 125, the displacement device 130 may function to decrease the pressure within the fluid network 200 to facilitate draining of fluid from the cavity 125. However, the processor may regulate the volume of fluid that is displaced into the cavities 125*a* and 125*b* with any other suitable method. Regulating the amount of flow or change in volume and/or pressure provided by the displacement device 130 may prevent or help decrease the over-expansion or over-retraction of the cavities 125. This regulation also allows for the possibility of varying degrees of expansion or retraction of individual cavities 125, for example, a half expanded state and a fully expanded state, depending on the type of user interface scenario.

3. Third Preferred Embodiment: Selective Expansion of Groups

Figure 15A:
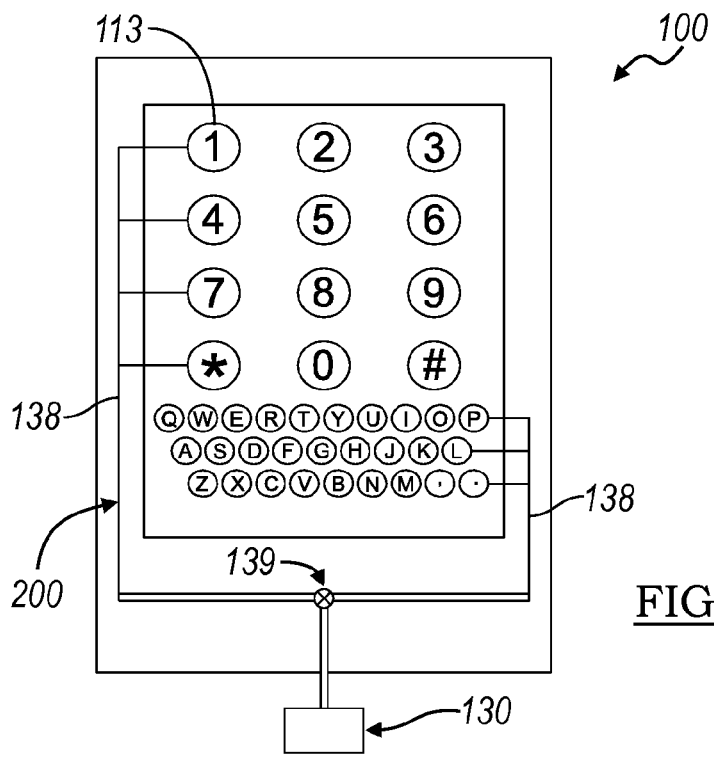
FIGS. 15a and 15b are schematic representations of two examples of groups of cavities.
Figure 15B:
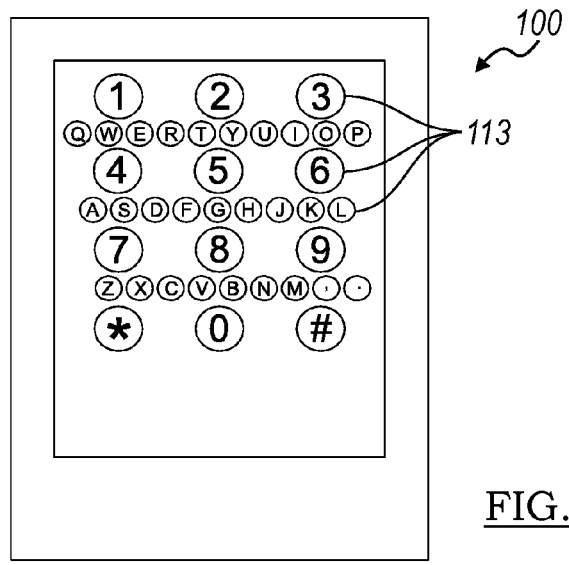
Figure 16:
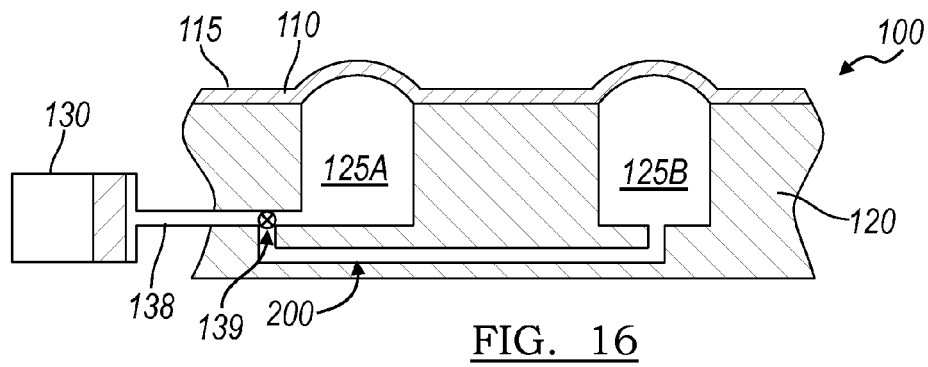
FIG. 16 is a schematic representation of channels arranged at different height levels within the sheet of the preferred embodiments.

In the third preferred embodiment, as shown in FIGS. 14-15, a first group of cavities 125 and a second group of cavities 125 are selectively expanded. Similar to the second preferred embodiment, the displacement device 130 of the third preferred embodiment preferably expands the first and second groups of cavities 125 in two modes: a first mode where only one of the first and second groups of cavities 125 is expanded, and a second mode where both of the first and second groups of cavities 125 are expanded. Alternatively, the displacement device 130 may expand only one of the first and second groups 125 at any one time. Each group of cavities 125 are preferably arranged as described in the first preferred embodiment and preferably functions to provide a particular interface for the user and preferably includes a number of cavities 125 suitable for the application, for example, a number dial pad or a QWERTY keyboard. The groups of cavities 125 may be placed adjacent to one another (for example, a QWERTY keyboard group adjacent to a number dial pad group, as shown in FIG. 15*a*) and/or interspersed with one another (for example, the QWERTY keyboard group is interleaved with the number pad group, as shown in FIG. 15*b*). In this variation, the branches of the channel 138 that couple each of the cavities 125 to the displacement device 130 may be arranged along different height levels within the sheet 111, as shown in FIG. 16. This may allow for the branches of the channel 138 to be arranged within a sheet in with a surface 115 of a lower surface area and/or allow each of the plurality of cavities 125 to be placed in closer proximity to each other. The branches of the channel 138 may be arranged in one of a variety of arrangements. In a first example, the branches coupling the cavities of the first group of cavities 125 to the displacement device 130 may be placed along a first height level within the sheet 111 and the branches coupling the cavities of the second group of cavities 125 to the displacement device 130 may be placed along another height level within the sheet 111. In a second example, the branches leading to each cavity 125 within one group of cavities 125 may be arranged on different height levels within the sheet 111. In a third example, the branches coupling a first subset of the cavities within a group of cavities 125 to the displacement device 130 may be arranged on a first height level within the sheet 111 and the branches coupling a second subset of the cavities within the group of cavities 125 to the displacement device 130 may be arranged on another height level within the sheet 111. The branches of the channel 138 may be arranged in any suitable combination of the above examples. However, any other suitable arrangement of the channel 138 within the sheet 111 may be used.

Figure 17:
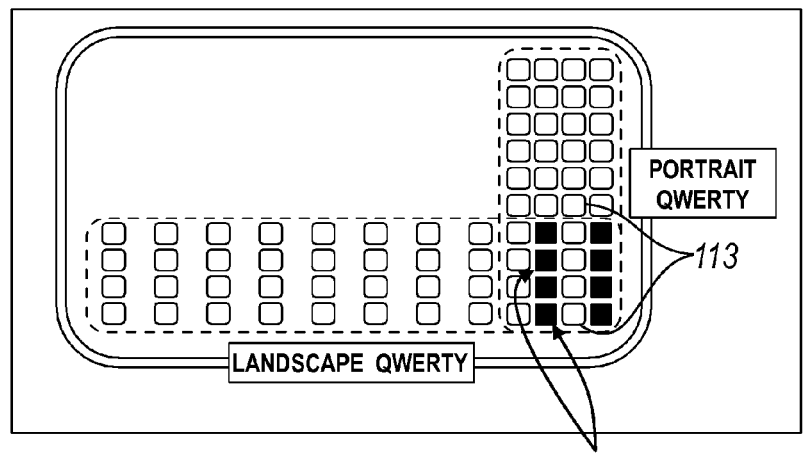
FIG. 17 is a schematic representation of groups of cavities with shared cavities.
Figure 18:
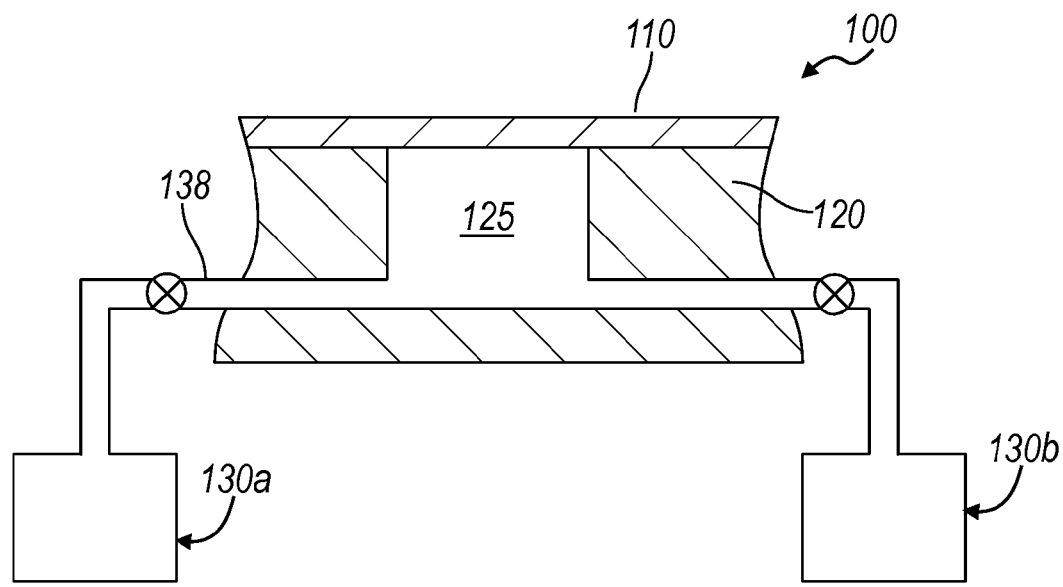
FIG. 18 is a schematic view of an arrangement of a cavity belonging to more than one group of FIG. 17.
Figure 19A:
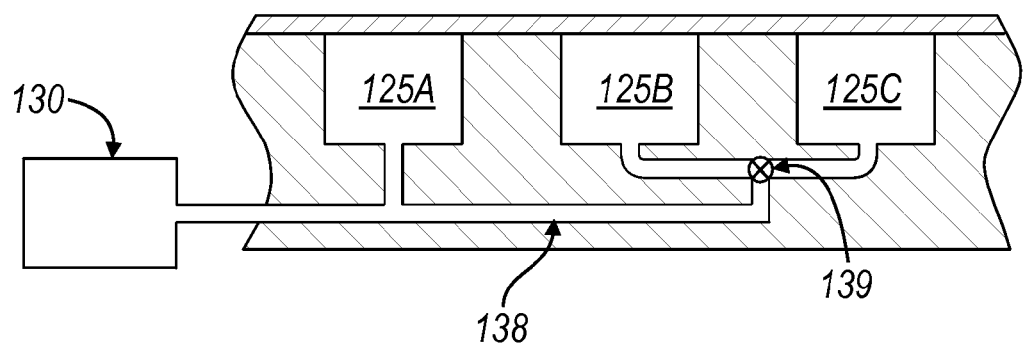
FIGS. 19a, 19b, 19c, and 19d are schematic representations of the different expansion modes of the cavities of the fourth preferred embodiment.
Figure 19B:
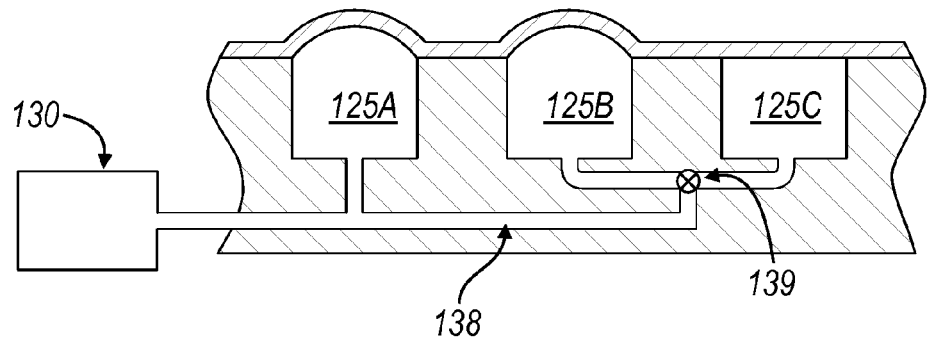
Figure 19C:
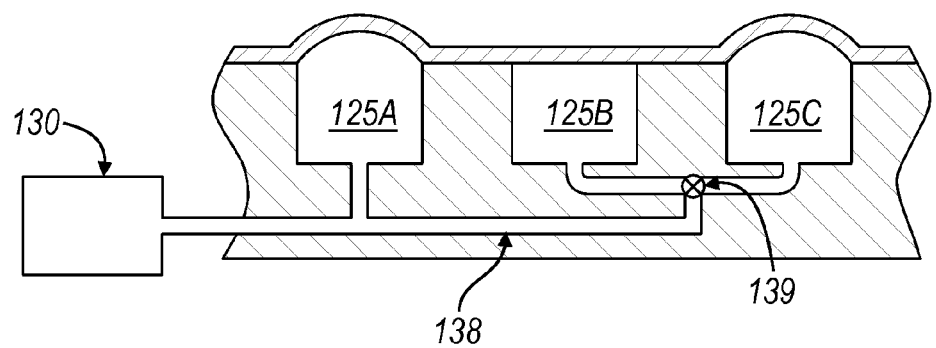
Figure 19D:
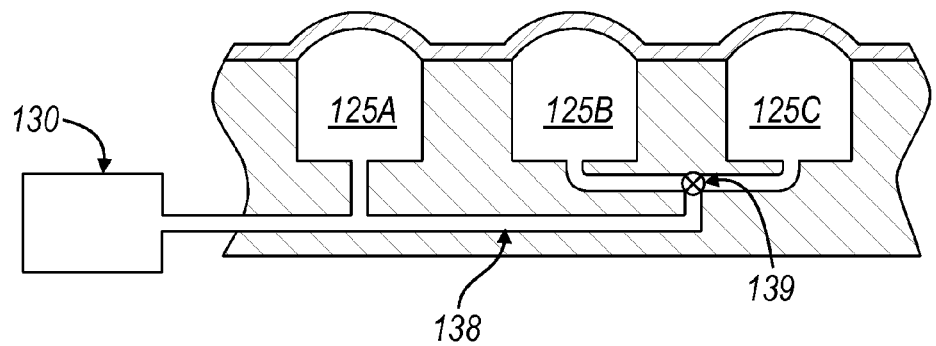

As shown in FIG. 14, similar to the second preferred embodiment, the third preferred embodiment includes a channel 138 that couples a first group of cavities 125 and a second group of cavities 125 to the displacement device 130. The first and second groups of cavities 125 are preferably not directly connected to each other. The channel 138 preferably forms a T-junction between the displacement device 130 and the two groups of cavities 125, and the channel preferably includes a valve 139 at the T-junction to direct fluid displaced by the displacement device 130 to one or both of the groups of cavities 125. However, the channel 138 may be of any other suitable orientation. The valve 139 is preferably of the type described above in the second preferred embodiment. In a variation where one cavity 125 may belong to more than one group of cavities 125, for example, as shown in FIG. 17 where a first group of cavities 125 that correlate to a landscape QWERTY keyboard and a second group of cavities 125 that correlate to a portrait QWERTY cavity 125 group share cavities 125. The shared cavities 125 may be thought of as a third group of cavities 125 that cooperates with the first group of cavities 125 to correlate to a landscape QWERTY keyboard and cooperates with the second group of cavities 125 to correlate to a portrait QWERTY keyboard. In this variation, each of the shared cavities 125 may be coupled to more than one channel 138, as shown in FIG. 18. This allows expansion of each shared cavity 125 when any of the displacement devices 130 pertaining to each of the groups to which the cavity 125 belongs is activated. To regulate the expansion of the cavity 125, the cavity 125 may include a valve of a type described above for valve 139 that prevents fluid from a first channel 138 belonging to a first group to flow through the cavity 125 to a second channel 138 belonging to a second group. The valve may also be used to prevent fluid from more than one channel 138 to expand the cavity 125, which may potentially cause the over-expansion of the cavity 125. However, any other suitable arrangement of a cavity 125 that may belong to more than one group may be used.

Similar to the second preferred embodiment, the third preferred embodiment preferably includes a processor that controls the displacement device 130 and the valve 139. The processor preferably regulates the volume of fluid that is displaced by the displacement device 130 and/or the volume of fluid that enters and exits the cavities 125 to expand and retracts the cavities 125 to prevent over expansion and over retraction. The processor preferably also determines if one (and which one) or both of the groups of cavities 125 is to be expanded. If the number of cavities within the first group of cavities 125 is different from the number of cavities within the second group of cavities 125, the processor preferably regulates the volume of fluid that is displaced by the displacement device 130 to accommodate for the difference in volume of fluid necessary to expand each group of cavities 125. In all other respects, the processor of the third preferred embodiments is preferably similar or identical to the processor of the second preferred embodiment.

4. Fourth Preferred Embodiment: Concurrent and Selective Expansion of Cavities

In a fourth preferred embodiment, as shown in FIGS. 19a-19d, the displacement device 130 preferably expands a first cavity 125a and one of a second cavity 125b and third cavity 125c at one time. Similar to the first preferred embodiment, the first cavity 125a is expanded concurrently with the expansion of any one of the second and third cavities 125b and 125c. Similar to the second preferred embodiment, the displacement device 130 of the fourth preferred embodiment preferably expands the second and third cavities 125b and 125c in two modes: a first mode where only one of the second and third cavities 125b and 125c is expanded, and a second mode where both of the second and third cavities 125b and 125c are expanded. Alternatively, the displacement device 130 may expand only one of the second and third cavities 125b and 125c at any one time. A variation of the fourth preferred embodiment may be similar to the third preferred embodiment. In this variation, the displacement device 130 may function to expand a first group of cavities 125 and one of a second group of cavities 125 and a third group of cavities 125 at one time. This variation may be applied to the variation of the user interface system 100 including cavities 125 that are shared between two groups of cavities 125, as shown in the landscape and portrait QWERTY example in FIG. 17 and described in the third preferred embodiment. The first group of cavities 125 preferably function as the shared cavities 125 that expanded whenever either one of the landscape QWERTY group or the portrait QWERTY group are to be expanded, and the second group of cavities 125 preferably functions as the non-shared QWERTY keys in the landscape QWERTY group and the third group of cavities 125 preferably functions as the non-shared QWERTY keys in the portrait QWERTY group. However, the fourth preferred embodiment may be applied to any other suitable arrangement.

As shown in FIGS. 19a-19d, similar to the first preferred embodiment, the fourth preferred embodiment includes a channel 138 that couples the first cavity 125a to the second and third cavities 125b and 125c. Similar to the second preferred embodiment, the channel 138 preferably does not directly connect the second cavity 125b to the third cavity 125c, preferably forms a T-junction between the displacement device 130 and the second and third cavities 125b and 125c, and preferably includes a valve 139 that directs fluid flow displaced by the displacement device 130 to one of or both of the second and third cavities 125b and 125c. However, the channel 138 may be of any other suitable orientation. The valve 139 is preferably of the type described above in the second preferred embodiment. Because the fluid flow to either one of the second or third cavities 125b and 125c passes through a valve 139 while fluid flow to the first cavity 125a does not, the valve 139 is preferably of a type that does not increase the pressure required to expand the second and third cavities 125b and 125c. For example, the valve 139 is preferably not actuated by the pressure of the fluid flow within the channel 138. Similar to the first preferred embodiment, the second and third cavities 125b and 125c may be of different geometries from the first cavity 125a to maintain substantially similar expansion start times and/or the size of the channel 138 leading to the second and third cavities 125b and 125c may be increased in size (in diameter and/or cross sectional area) to decrease the pressure necessary for fluid to travel through the channel 138. However, any other geometry or method of allowing both the first cavity 125*a* and one of or both of the second and third cavities 125*b* and 125*c* to start expansion substantially at the same time and at the same rate may be used. The first cavity 125*a* and one of or both of the and second and third cavities 125*b* and 125*c* may also be allowed to start expansion at different times.

Similar to the second preferred embodiment, the fourth preferred embodiment preferably includes a processor that controls the displacement device 130 and the valve 139. The processor preferably regulates the volume of fluid that is displaced by the displacement device 130 and/or the volume of fluid that enters and exits the cavities 125 to expand and retracts the cavities 125 to prevent over expansion and over retraction. The processor preferably also determines if one (and which one) or both of the second and third cavities 125*b* and 125*c* is to be expanded. In the variation of the fourth preferred embodiment where the displacement device 130 functions to expand a first group of cavities 125 and one of a second and third group of cavities 125, if the number of cavities within the second group of cavities 125 is different from the number of cavities within the third group of cavities 125, the processor preferably regulates the volume of fluid that is displaced by the displacement device 130 to accommodate for the difference in volume of fluid necessary to expand each group of cavities 125. In all other respects, the processor of the fourth preferred embodiments is preferably similar or identical to the processor of the second preferred embodiment.

The user interface system may include a plurality of displacement devices 130 and/or a plurality of valves 139. All of the cavities 125 of the plurality of cavities 125 are preferably arranged within one fluid network 200, but may alternatively be arranged in more than one fluid network 200. The displacement device 130 and/or valves 139 are preferably also arranged within one fluid network 200 and are preferably controlled by one processor, but may alternatively be arranged in more than one fluid network 200 and may be controlled by more than one processor. However, the plurality of cavities 125, displacement device 130, and valves 139 may be arranged in any other suitable arrangement.

While omitted for conciseness, the invention includes every possible permutation and combination of the various elements described above.

As a person skilled in the art will recognize from the previous detailed description and from the figures and claims, modifications and changes can be made to the preferred embodiments of the invention without departing from the scope of this invention defined in the following claims.

We claim:

1. A user interface comprising:
   a substrate comprising an attachment face and a plurality of support members continuous with the attachment face, each support member including a fluid channel configured to communicate fluid through the support member, the substrate defining a fluid network fluidly coupled to a portion of the fluid channels;
   a tactile layer comprising an outer tactile surface and a back surface opposite the tactile surface, the back surface coupled to the attachment face at an undeformable region of the tactile layer, the back surface adjacent to and disconnected from the support members at a plurality of deformable regions of the tactile layer, each deformable region of a thickness at least as great as a width dimension of a corresponding fluid channel, each support member configured to limit inward deformation of a corresponding deformable region due to a force applied to the tactile surface;
   a displacement device configured to displace fluid through the fluid network and toward the back surfaces of a portion of the deformable regions to transition each of the portion of deformable regions from a retracted setting to an expanded setting tactilely distinguishable from the retracted setting at the tactile surface; and
   a touch sensor coupled to the substrate and configured to detect a user touch on the tactile surface.

2. The user interface of claim 1, wherein the attachment face and the support members are planar.

3. The user interface of claim 1, wherein the deformable and undeformable regions of the tactile layer are adjacent and of substantially similar thicknesses.

4. The user interface of claim 1, wherein, in the retracted setting, the tactile surface of the deformable regions is flush with the tactile surface of the undeformable region.

5. The user interface of claim 4, wherein, in the expanded setting, the tactile surface of the portion of the deformable regions is elevated above a portion of the tactile surface of the undeformable region.

6. The user interface of claim 1, wherein, in the retracted setting, the back surface of the each deformable region is in contact with the corresponding support member.

7. The user interface of claim 1, further comprising a display coupled to the substrate and configured to visually output an image through the tactile surface.

8. The user interface of claim 7, wherein the display is configured to output the image that is an input key substantially aligned with at least one deformable region.

9. The user interface of claim 7, wherein the display and the touch sensor are physically coextensive.

10. The user interface of claim 1, wherein the displacement device is a pump.

11. The user interface of claim 1, wherein the displacement device is further configured to displace fluid away from the back surface of each of the deformable regions to transition the deformable regions from the expanded setting to the retracted setting.

12. The user interface of claim 1, wherein the displacement device is further configured to selectively transition a portion of the deformable regions between the retracted and expanded settings.

13. The user interface of claim 1, further comprising a valve coupled to the fluid network and configured to selectively direct fluid through a portion of the fluid network.

14. The user interface of claim 1, wherein the substrate further defines a cavity adjacent each support member and configured to communicate fluid between the fluid network and the corresponding fluid channel.

15. The user interface of claim 14, wherein the fluid network comprises a first fluid branch, configured to communicate fluid from the displacement device to a first group of cavities, and a second fluid branch, configured to communicate fluid from the displacement device to a second group of cavities.

16. The user interface of claim 15, wherein the first fluid branch is arranged at a first depth within the substrate and the second fluid branch is arranged at second depth within the substrate.

17. The user interface of claim 15, further comprising a valve coupled to the fluid network between the first fluid branch and the second fluid branch.

18. The user interface of claim 1, wherein a first deformable region is of a first elasticity and a second deformable region is of a second elasticity different than the first elasticity.

19. The user interface of claim 1, wherein a first deformable region is of a first geometry and a second deformable region is of a second geometry different than the first geometry.

20. The user interface of claim 1, further comprising a second displacement device coupled to the fluid network and configured to cooperate with the displacement device to displace fluid through the fluid network.

21. The user interface of claim 1, wherein a first group of deformable regions correspond to the letters of a QWERTY keyboard, and wherein a second group of deformable regions correlate to the numbers of a 0 through 9 of a numeric keypad.

22. The user interface of claim 21, wherein a third group of deformable regions cooperates with the first group of deformable regions to correspond to the letters of a landscape QWERTY keyboard, and wherein the third group of deformable regions cooperates with the second group of deformable regions to correlate to the letters of a portrait QWERTY keyboard.

23. The user interface of claim 1, further comprising a processor coupled to the sensor and configured to interpret a deformation of a deformable region as a force applied to the tactile surface proximal the deformable region.

24. The user interface of claim 23, wherein the processor is further configured to control the displacement device.

25. The user interface of claim 1 incorporated into an electronic device selected from the group consisting of: an automotive console, a desktop computer, a laptop computer, a tablet computer, a television, a radio, a desk phone, a mobile phone, a PDA, a personal navigation device, a personal media player, a camera, and a watch.

* * * * *